(12) United States Patent
Simpkinson et al.

(10) Patent No.: US 11,850,514 B2
(45) Date of Patent: Dec. 26, 2023

(54) PHYSICAL GAMES ENHANCED BY AUGMENTED REALITY

(71) Applicant: Vulcan Inc., Seattle, WA (US)

(72) Inventors: Richard Earl Simpkinson, Issaquah, WA (US); Omer Rosenbaum, Kirkland, WA (US); Rusty Allen Gerard, Bothell, WA (US); David Joseph Martinez, Seattle, WA (US); Meng Yu, Bellevue, WA (US); Keith Rosema, Seattle, WA (US); Shamyl Emrich Zakariya, Seattle, WA (US); Tyler Jay Perry, Redmond, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 16/565,337

(22) Filed: Sep. 9, 2019

(65) Prior Publication Data

US 2020/0078680 A1 Mar. 12, 2020

Related U.S. Application Data

(60) Provisional application No. 62/774,035, filed on Nov. 30, 2018, provisional application No. 62/728,679, filed on Sep. 7, 2018.

(51) Int. Cl.
*A63F 13/5375* (2014.01)
*A63F 13/79* (2014.01)
(Continued)

(52) U.S. Cl.
CPC ........ *A63F 13/5375* (2014.09); *A63F 13/497* (2014.09); *A63F 13/79* (2014.09);
(Continued)

(58) Field of Classification Search
CPC ....... A63F 13/497; A63F 13/65; A63F 13/216
See application file for complete search history.

(56) References Cited

U.S. PATENT DOCUMENTS 6,080,063 A * 6/2000 Khosla .................... A63F 13/10
463/42
8,384,542 B1 2/2013 Merrill et al.
(Continued)

FOREIGN PATENT DOCUMENTS

CN 107897068 A 4/2018
JP 2017093425 A 6/2017
(Continued)

OTHER PUBLICATIONS

International Invitation to Pay Additional Fees dated Jun. 2, 2020, in International Patent Application No. PCT/US2020/016882, filed Feb. 5, 2020, 21 pages.
(Continued)

*Primary Examiner* — Jay Trent Liddle
(74) *Attorney, Agent, or Firm* — Davis Wright Tremaine LLP

(57) ABSTRACT

Systems and techniques for enhancing the physical games with augmented reality is described. A system identifies a characteristic of a physical object that is located on a physical surface. The system obtains, based on the characteristic, information indicative of a rule set for the game and a state of the game based on the characteristic. A game engine is initialized based on the rule set and game state. The game engine generates a subsequent state for the game. The system renders, based on the subsequent state, an augmented reality display that incorporates the physical surface and physical object.

20 Claims, 12 Drawing Sheets

(51) Int. Cl.
*A63F 13/497* (2014.01)
*G06T 11/00* (2006.01)
*G06F 3/01* (2006.01)
*A63F 3/02* (2006.01)

(52) U.S. Cl.
CPC .............. *G06F 3/011* (2013.01); *G06T 11/00* (2013.01); *A63F 3/02* (2013.01); *A63F 2300/305* (2013.01); *A63F 2300/5546* (2013.01); *A63F 2300/634* (2013.01); *A63F 2300/69* (2013.01)

(56) References Cited

U.S. PATENT DOCUMENTS

| | | | |
|---|---|---|---|
| 9,317,916 | B1 | 4/2016 | Hanina et al. |
| 9,782,668 | B1* | 10/2017 | Golden ................ A63F 13/216 |
| D817,195 | S | 5/2018 | Iyengar |
| 10,143,925 | B2* | 12/2018 | Middleton ............ A63F 13/217 |
| 10,192,126 | B2 | 1/2019 | Yamanaka et al. |
| 10,279,264 | B1* | 5/2019 | Aghdaie ............ A63F 13/5375 |
| 10,579,869 | B1 | 3/2020 | Xiong et al. |
| 10,675,536 | B2* | 6/2020 | Chen .................... A63F 13/837 |
| 10,839,203 | B1 | 11/2020 | Guigues et al. |
| 10,989,815 | B2 | 4/2021 | Dmitriev et al. |
| 11,036,303 | B2 | 6/2021 | Rani et al. |
| 11,132,606 | B2 | 9/2021 | Taylor |
| 11,249,179 | B2 | 2/2022 | Hamasaki et al. |
| 11,337,358 | B2 | 5/2022 | Fletcher et al. |
| 2003/0142587 | A1 | 7/2003 | Zeitzew |
| 2006/0223635 | A1* | 10/2006 | Rosenberg ............ A63F 13/332 463/37 |
| 2008/0170123 | A1 | 7/2008 | Albertson et al. |
| 2008/0176583 | A1 | 7/2008 | Brachet et al. |
| 2009/0005140 | A1* | 1/2009 | Rose ........................ A63F 13/12 463/7 |
| 2010/0156660 | A1 | 6/2010 | Lee et al. |
| 2011/0216060 | A1* | 9/2011 | Weising ................ G06F 3/0346 345/419 |
| 2011/0298827 | A1 | 12/2011 | Perez |
| 2011/0301934 | A1 | 12/2011 | Tardif |
| 2012/0079990 | A1 | 4/2012 | Fuhr et al. |
| 2012/0083325 | A1* | 4/2012 | Heatherly ................ A63F 9/24 463/16 |
| 2012/0243375 | A1 | 9/2012 | Melvin, II et al. |
| 2012/0281181 | A1 | 11/2012 | Chen et al. |
| 2013/0077820 | A1 | 3/2013 | Marais et al. |
| 2013/0261856 | A1 | 10/2013 | Sharma et al. |
| 2014/0032034 | A1 | 1/2014 | Raptopoulos et al. |
| 2014/0153794 | A1 | 6/2014 | Varaklis et al. |
| 2014/0253590 | A1 | 9/2014 | Needham et al. |
| 2014/0267008 | A1 | 9/2014 | Jain et al. |
| 2014/0310595 | A1 | 10/2014 | Acharya et al. |
| 2015/0177842 | A1 | 6/2015 | Rudenko |
| 2016/0078289 | A1 | 3/2016 | Michel et al. |
| 2016/0086349 | A1 | 3/2016 | Shotton et al. |
| 2016/0180468 | A1 | 6/2016 | Buss et al. |
| 2016/0243434 | A1* | 8/2016 | Yim ........................ A63F 13/537 |
| 2016/0328604 | A1 | 11/2016 | Bulzacki |
| 2017/0144756 | A1 | 5/2017 | Rastgaar Aagaah et al. |
| 2017/0148339 | A1* | 5/2017 | Van Curen ............ H04N 13/271 |
| 2017/0168586 | A1 | 6/2017 | Sinha et al. |
| 2017/0190051 | A1 | 7/2017 | O'Sullivan et al. |
| 2017/0193708 | A1* | 7/2017 | Lyons .................... A63F 13/87 |
| 2017/0208493 | A1 | 7/2017 | Masson et al. |
| 2017/0212210 | A1 | 7/2017 | Chen et al. |
| 2017/0227638 | A1 | 8/2017 | Nicoletti et al. |
| 2017/0234966 | A1 | 8/2017 | Naguib et al. |
| 2017/0280678 | A1 | 10/2017 | Jones et al. |
| 2017/0293742 | A1 | 10/2017 | Sadeghi et al. |
| 2017/0293824 | A1 | 10/2017 | Chen et al. |
| 2017/0313421 | A1 | 11/2017 | Gil |
| 2017/0344859 | A1 | 11/2017 | Mo |
| 2017/0358144 | A1 | 12/2017 | Schwarz et al. |
| 2018/0018861 | A1 | 1/2018 | Locke et al. |
| 2018/0020329 | A1 | 1/2018 | Smith |
| 2018/0024641 | A1 | 1/2018 | Mao et al. |
| 2018/0093186 | A1* | 4/2018 | Black .................... G06T 11/60 |
| 2018/0122043 | A1 | 5/2018 | Energin et al. |
| 2018/0213713 | A1 | 8/2018 | Zito, Jr. et al. |
| 2018/0263170 | A1 | 9/2018 | Aghai et al. |
| 2018/0310532 | A1 | 11/2018 | Hickson et al. |
| 2018/0330810 | A1 | 11/2018 | Gamarnik et al. |
| 2019/0000350 | A1 | 1/2019 | Narayan et al. |
| 2019/0038222 | A1 | 2/2019 | Krimon et al. |
| 2019/0061890 | A1 | 2/2019 | Fiorello |
| 2019/0091582 | A1* | 3/2019 | Reiche, III ............ A63F 13/25 |
| 2019/0124893 | A1 | 5/2019 | Bolen |
| 2019/0217198 | A1* | 7/2019 | Clark .................... A63F 13/54 |
| 2019/0221035 | A1* | 7/2019 | Clark .................... A63F 13/53 |
| 2019/0294881 | A1 | 9/2019 | Polak et al. |
| 2019/0325605 | A1 | 10/2019 | Ye et al. |
| 2019/0383903 | A1 | 12/2019 | Chao et al. |
| 2020/0005028 | A1 | 1/2020 | Gu |
| 2020/0050342 | A1 | 2/2020 | Lee |
| 2020/0055570 | A1 | 2/2020 | Brink et al. |
| 2020/0057425 | A1 | 2/2020 | Seibert et al. |
| 2020/0160535 | A1 | 5/2020 | Ali Akbarian et al. |
| 2020/0234231 | A1 | 7/2020 | Stevenson et al. |
| 2020/0238177 | A1* | 7/2020 | Black .................... A63F 13/30 |
| 2020/0284903 | A1 | 9/2020 | Zach et al. |
| 2020/0289922 | A1* | 9/2020 | McCoy .................. G06T 15/20 |
| 2020/0394393 | A1 | 12/2020 | Kraft et al. |

FOREIGN PATENT DOCUMENTS

| | | |
|---|---|---|
| KR | 20170139093 A | 12/2017 |
| WO | 2017132563 A1 | 8/2017 |

OTHER PUBLICATIONS

International Search Report and Written Opinion dated Jul. 23, 2020, Patent Application No. PCT/US2020/016882, 19 pages.

Kramar, V., et al., "Particularities of Visualisation of Medical and Wellness Data Through a Digitial Patient Avatar", 14th Conference of Open Innovation Association FRUCT, 2013, 12 pages.

Charles, "GPS Goes Mainsteam," NPR, Dec. 26, 2007, 7 pages.

Langley et al., "Approaches to Machine Learning," Department of Computer Science Carnegie-Mellon University, Feb. 16, 1984, 28 pages.

Ocean News, "Meet RangerBot, Robot Reef Protector," Sep. 4, 2018, 7 pages.

Chamberland, et al., "New Seeding Approach Reduces Costs and Time to Outplant Sexually Propagated Corals for Reef Restoration," www.nature.com/Scientificreports, Dec. 22, 2017, 12 pages.

* cited by examiner

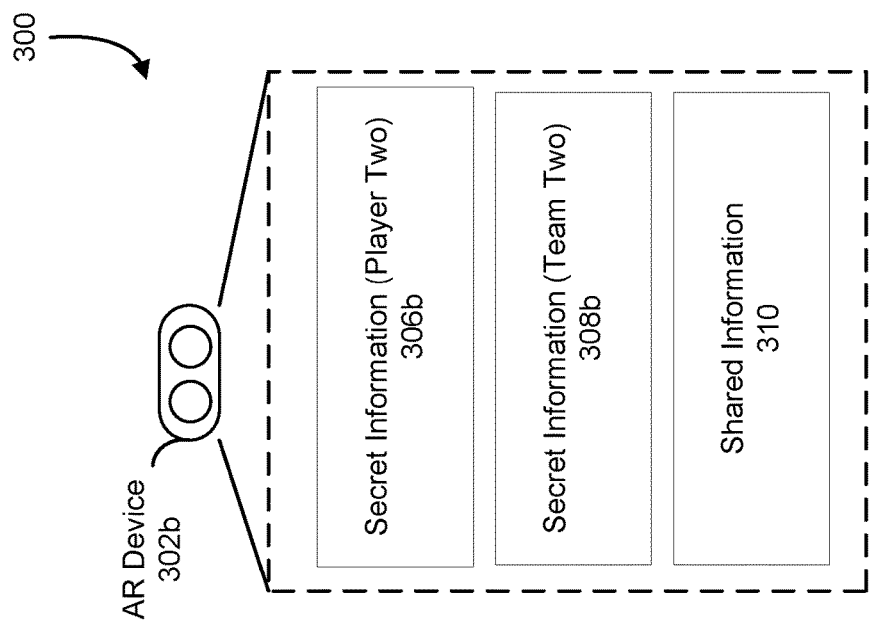
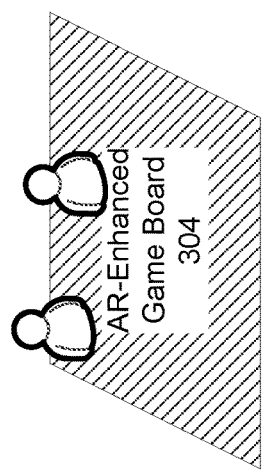
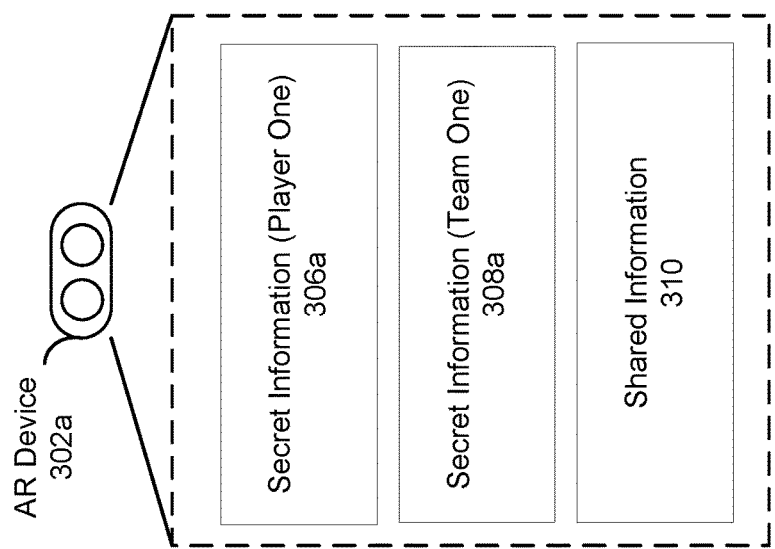
FIG. 3

PHYSICAL GAMES ENHANCED BY AUGMENTED REALITY

CROSS-REFERENCE TO RELATED APPLICATIONS

This application claims the benefit of U.S. Provisional Patent Application No. 62/728,679, filed Sep. 7, 2018, and of U.S. Provisional Patent Application No. 62/774,035, filed Nov. 30, 2018, the disclosures of which are herein incorporated by reference in their entirety.

BACKGROUND

Computer games sometimes possess features or characteristics not found in physical games, such as those played with tangible game boards and game pieces. Computer games can excel at presenting the actions of a game from the viewpoint of an individual participant, can include any of a variety of animations or audio effects, and so forth. Likewise, computer games do not require their participants to possess specialized game boards or game pieces. More generally, the gameplay of computer games is not bound by the constraints of the physical world. Conversely, physical games therefore lack many of the features found in computer games.

BRIEF DESCRIPTION OF THE DRAWINGS

Various techniques will be described with reference to the drawings, in which:

FIG. 3 illustrates an example of selective information sharing to enhance an adversarial game, in accordance with an embodiment;

DETAILED DESCRIPTION

Figure 1:
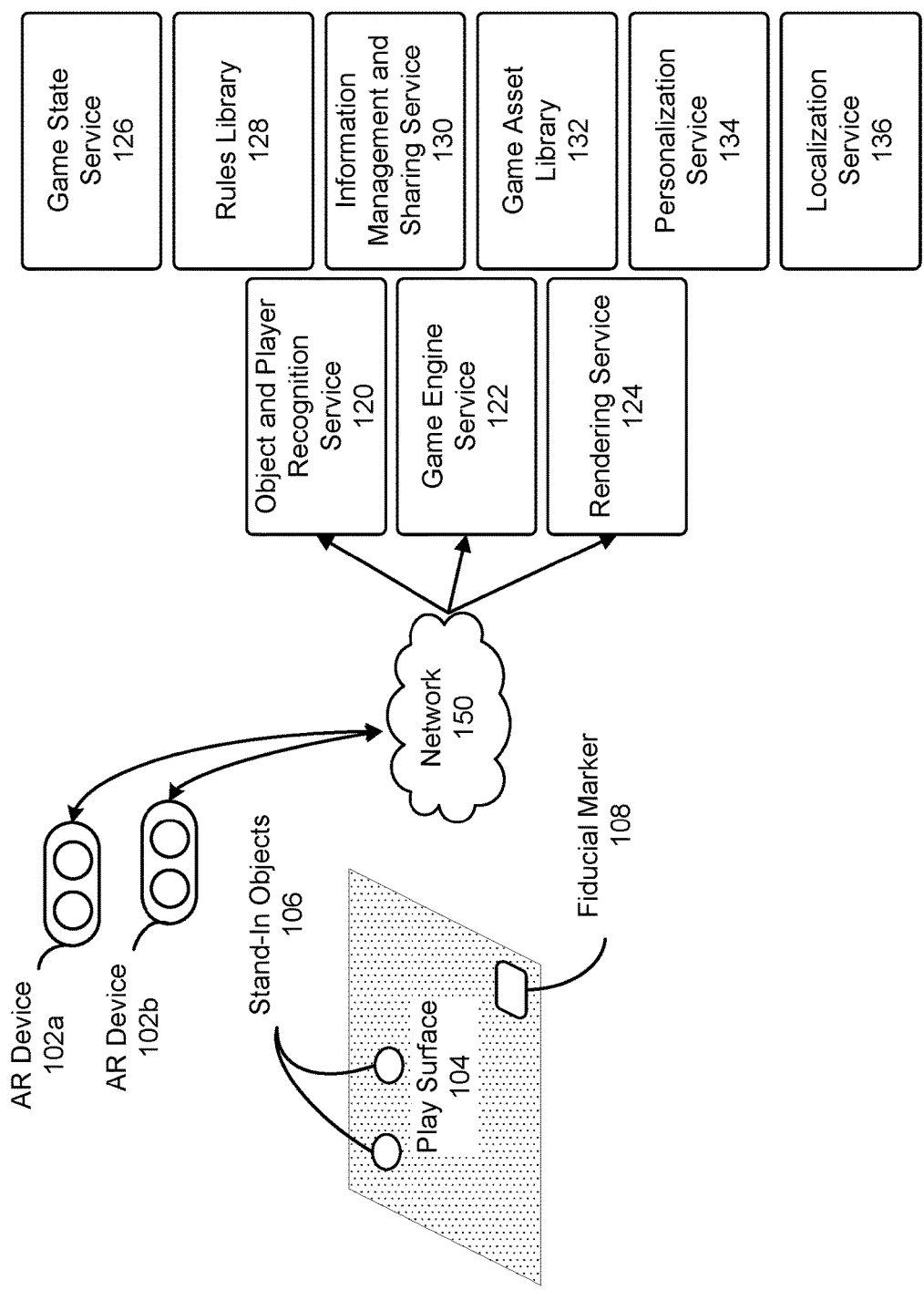
FIG. 1 illustrates an example gaming system, in accordance with an embodiment.

Systems, devices, and techniques described herein relate to the enhancement of physical games using augmented-reality ("AR") systems, devices and techniques. Moreover, at least some embodiments of the systems, devices, and techniques described herein comprise a system of services that enhance the gameplay of physical games using augmented reality. Physical games refers to games that comprise at least some physical components, such as a real-world surface on which the game is played, a real-world object, and so forth. As described herein, gameplay refers to the conduct of a game which has at least some physical aspects. Examples include, but are not necessarily limited to, games such as chess or checkers in which the players may not necessarily possess all of the required physical components. Another example is a role-playing game in which the player's possess some, but not all, of the figurines needed to represent the game participants.

In an embodiment, a system of services, which may also be described as an augmented reality platform, interacts with an AR device to provide enhanced gameplay for physical games. In the example embodiment, a player places a physical object (such as a token) on a physical surface (such as a mat or tabletop). The AR device captures video data including the token and provides it to the system, which then recognizes the token. The system associates the token with a game, and generates an augmented reality display that, on the AR device, incorporates the physical surface and facilitates gameplay.

In a further aspect of the example embodiment, a component of the system maintains a combined state of the virtual and physical components of the game. This component may be referred to as a game engine. The game engine obtains inputs and movements from the players, updates the state of the game, and presents an augmented reality view of the game that is consistent with the updated game state. For example, a user may manipulate "stand-in" objects on the physical surface to indicate moves in the game. These movements are observed by an AR device. The game engine is provided, through the system, with information indicative of the movements. The game engine then updates the game state accordingly. Inputs might also be provided from other sources, such as other players, or in response to various events. The inputs to the game engine are processed and used, by the game engine, to update the game state. The game engine can therefore receive updates from both physical and virtual sources and update the game state accordingly. The updated state can then be used to generate augmented reality displays for presentation to the players.

In an example, an AR device user may place a token on a playing surface. A system, comprising or in communication with the AR device, recognizes the identity of the token, associates the token with a game, and causes a version of the game, using the AR device, to be displayed so that it incorporates the playing surface. A component of the system, which may be referred to as a game engine, maintains a combined state of the virtual and physical components of the game. For example, some aspects of the game might be represented by physical tokens on the playing surface. Other aspects may be purely virtual. The game engine updates the combined state and presents it to the players. Each player's experience may be customized according to factors such as localization references, skill level, experience, and perspective. For example, in some cases, the customization involves localizing the gameplay to reflect the player's language or culture. In other cases, the customization involves adjusting the gameplay to reflect variances in skill level. This can be applied, for example, to maintain an illusion that each player is of approximately equal skill, while also permitting each player to exert his or her best effort at playing the game. The personalization may also involve facilitating a player's participation in an activity as a student, and likewise facilitating another player's participation in the activity as a teacher.

The localization and personalization techniques may also be applied to games, such as billiards, that based on a relatively high degree of physical skill. For example, an augmented reality enhanced gameplay system, as described herein, may be used to provide skill-level based enhancements to a game such as billiards by provide varying degrees of insight to a player. The degree of insight that is provided may be based on skill, and might decline as that player's skill improves. For example, a system might provide insights on the expected effect of a billiards shot to a junior player, such that the line each ball is expected to follows, and suggestions for improving the shot. For a more experienced player, the system might simply provide warnings when a shot is determined to have a high likelihood of failing. The system might continuously assess the player's skill level (using insights generated by a game engine service, based on statistics derived from observations made during turns of the game) to adjust the level of assistance provided. Similar techniques may be applied to other physical activities, such as exercising. For example, the system might provide suggestions for correcting form, or implement a scoring system that helps individuals of varying degrees of fitness to engage in a competition to determine who performed their personal best.

The localization and personalization techniques may also be applied to non-game activities, including procedural activities or "goal seeking" activities. One example is cooking. For example, an AR device and AR system, as described herein, might provide various levels of assistance to a user who is following a recipe. A novice chef might be provided with more detailed instructions, supplementing whatever information is provided in the new chef's recipe book. A more advanced chef might be provided with less information, or be provided with suggestions for varying the recipe. Localization might also be performed. For example, cooking units expressed in kilograms might be converted to pounds, or the system might provide suggestions for substituting exotic ingredients in the recipe with more readily available items.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of augmented reality, especially as it applies to the enhancement of games played at least partially in the physical world.

In an embodiment, a system provides the ability for a user to play a wide variety of games, while possessing a limited set of physical components. These physical components might be generalized or dedicated game pieces, or might even be everyday objects used in place of game pieces. For example, the system might allow commonplace six-sided dice to be used as stand-ins for more complex type of dice, such as twenty-sided dice. The AR-enhanced dice might further include custom faces, such as symbols instead of the pips ordinarily found on six-sided dice. In another example, a coin might be used as a stand-in for a game piece such as a pawn or knight.

In an embodiment, a system provides the ability to present information to players of a physical game in a selective fashion. The provided information may be based on game state such as character position, the condition of the character within the game, and so forth. For example, each player may view the board differently based on their respective character's position on the game board, or based on where that character has explored. A system for enhancing physical games might, for example, selectively provide information to a player whose character is near one position on the board, but not provide the information to a player whose character is not at that position.

In an embodiment, a system facilitates the selective exchange of information between certain players, such as members of a team. The system identifies team members based on the game state, identifies AR devices capable of providing information to the corresponding users, and shares the information.

In an embodiment, a system provides enhanced gameplay by providing dynamic responses to changes in game state. For example, certain changes to the game state may trigger the presentation of a movie or music to selected players, based on events occurring in the physical game. This might occur, for example, upon a player victory or defeat, or to signal or enhance the mood of a new phase of gameplay.

In an embodiment, a system described herein provides the ability for game history to be viewed by current or former players, or by third parties. This can include a "replay" capability which enables a user of the system to view a previously played game or turn. This may be done by recording changes in the game state over time and regenerating the previously displayed augmented reality scenes. Elements of the scene that were real-world when initially played may be replaced, in the replay, with virtual elements. The replay may comprise video or audiovisual data representative of the data, and may include or exclude a depiction of the physical elements of the augmented reality gameplay.

In an embodiment, a system described herein provides the ability to incorporate expansion features into a physical game, without requiring the player to possess any additional physical components. The system may further help users acquire or manage licenses to expansion features. As an example, certain games utilize card-based game mechanics. The purchase of an expansion set introduces a new set of cards. Here, the expansion may be purchased and implemented digitally, rather than requiring the physical acquisition of a new set of cards. Stand-in objects, such as blank cards, can be rendered in augmented reality as cards from an expansion set.

In an embodiment, a system described herein allows for players to create or provide house rules that are applicable only to their copy of the game, or to support evolution of a game's rules over time. For example, changes to a game board may be applied by being rendered in the augmented reality display, rather than being permanently imprinted on the physical surface.

In an embodiment, a system described herein allows for players to take actions in the game independently of their turn. For example, rather than wait for their turn in the physical game, the player may input actions to be taken subsequently. This may have the effect of speeding gameplay.

In an embodiment, a system described herein facilitates the coordination of activities between players. For example, players on a team may enter prospective moves, which can be displayed to other players on the same team. The player's actions may then be executed simultaneously, or in-turn. The system may also facilitate gameplay in which that players are unaware of their teammate's intended plans, by facilitating concealed input of player intentions. Such interactions may be difficult or impractical when conventional physical games are played without incorporating aspects of the techniques described herein.

In an embodiment, a system described herein facilitates enforcing rules or educating players concerning the rules of a game, or providing insights into play. For example, the system may present AR-assisted tutorials or gameplay hints. These may be performed based in part on an indicated or perceived skill level of the participants.

In an embodiment, a system described herein provides for the state of a physical game to be saved and restored, at a later time. The system may facilitate the setup or restoration of the state of a physical game. The system may, for example, identify a game state known to the system's game engine, and compare that state to an observed state of a physical surface and physical objects placed on the surface. The system may then present, in augmented reality, information that assists the players in manipulating the objects or surface to comply with the game state.

In an embodiment, a system described herein allows for physical components to represent game types, or to represent extensions to a game. For example, a game vendor might provide a game surface, such as a mat or game board, which represents the "basic" version of a game. The system may observe the mat or board and facilitate gameplay using the basic rules. However, additional objects, such as cards or tokens, might be used to present expansion features. For example, the game vendor might provide expansion cards which, when recognized by the system, cause the system to facilitate gameplay using an expanded version of the rules.

In an embodiment, a system described herein uses household objects to represent components of a game. For example, an AR-enhanced experience may permit the creation of a Rube Goldberg machine comprising ramps, trampolines, bumpers, and so forth, using everyday objects such as forks, spoons, cups, and so on. The system may provide consistent classification of these objects, so that a fork consistently represents a ramp. A process of discovery may thereby be enabled, where a user may discover that a spoon always represents a ramp, a cup always represents a funnel, and so on. It will be appreciate that this example is intended only as an illustration, and that embodiments disclosed herein may facilitate a variety of gameplay types using various objects to act as stand-ins for various components of a game. As described herein, these stand-in objects may be rendered in augmented reality as their corresponding in-game components.

In an embodiment, a system described herein provides for assisted gameplay. For example, the system might provide facilities which allow a player (for example, a chess player) to explore alternate future states of the game. The system may also, in some embodiments, provide for the assisted or automatic computation of scores, or the tracking or computation of other game states.

In an embodiment, a system described herein allows for "fog-of-war" features. This refers to information that is selectively provided to a player based on various game factors. For example, in certain games a player might be presented with current information related to an area the player's character is able to observe, but not provide current information related to areas the character cannot presently observe. In an embodiment, available information is rendered in augmented reality, e.g. by superimposing the information on top of the game surface.

In an embodiment, a system described herein allows for the creation of "illusionary walls" or other game elements that are viewed differently by different players in the game. For example, a player who created an illusionary wall may bypass it, while a player not aware of the wall's origin sees and experiences the wall as if it were real. This may continue until it is determined, based on gameplay, that the player is made aware of the wall's origin.

In an embodiment, a system described herein allows for the sharing of physical gameplay experiences with others, including remote participants. For example, the system may record changes to the game state as it progresses, and render an all-virtual version of the gameplay to remote participants. Alternatively, the rendered augmented reality video may be recorded and synchronized to the evolution of the game state. In either case, replay of the game may be rewound or fast-forwarded to specific points in the game, as indicated by a given game state.

In an embodiment, physical or virtual challenges are incorporated into the physical gameplay. For example, the players might participate in a physically conducted game of "rock-paper-scissors" to adjudicate a gameplay result. Embodiments may also incorporate, into the physical gameplay, virtual challenges which require varying levels of skill, such as solving math problems, sliding puzzles, color or shape matching, and so forth. The challenge level can be set as a player handicap, a player-configured option, or to adjust the difficulty automatically for all players. The adjustment may, for example, be made by the game engine in accordance with the game rules, available expansions, and configuration information.

Certain techniques described herein may also be applicable to scenarios other than physical gameplay. For example, certain of the techniques described herein may be employed to enhance the experience of a sporting event, or the reading of a physical book. In another example, everyday items (such as glasses and liquids) may be used as a virtual chemistry set. In another example, a user experiences a puzzle game using simple physical objects as a stand-in. In a further aspect, a physical object is experienced in augmented reality as an object that evolves or change over time or based on an inspection of the object.

Figure 12:
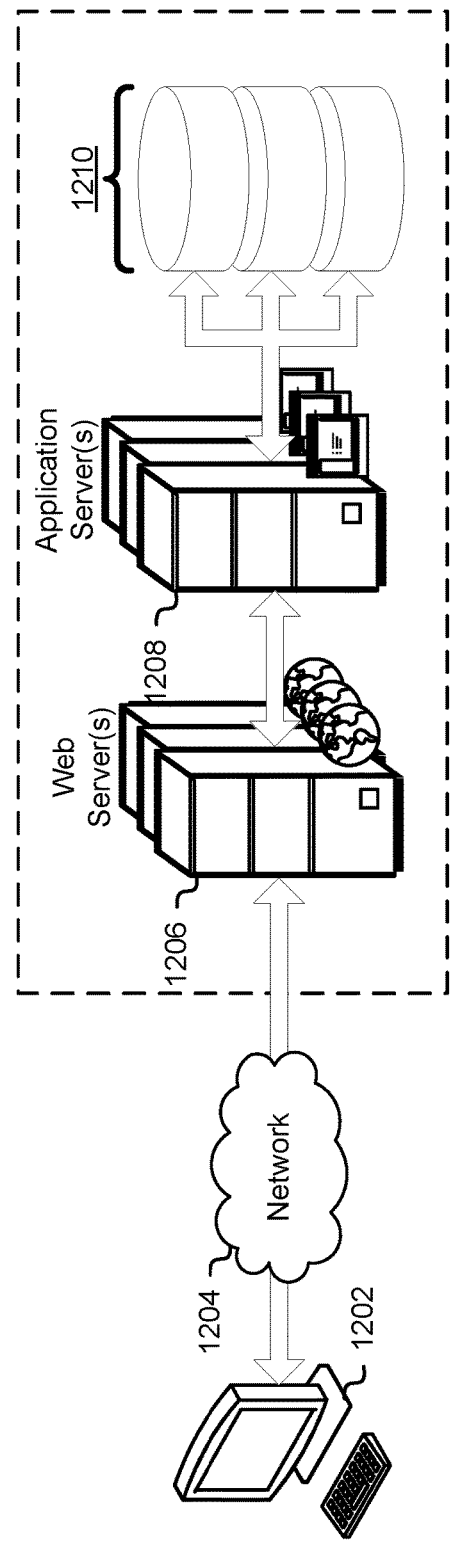
FIG. 12 illustrates an environment in which various embodiments can be implemented.

FIG. 1 illustrates an example gaming system 100, in accordance with an embodiment. The example system 100 may, in various aspects and embodiments, incorporate some or all of the features described above, in various combinations. In the example of FIG. 1, the system 100 comprises AR devices 102*a,b* which communicate, via a network 150, with various services, including an object and player recognition service 120, a game engine service 122, and a rendering service 124. As used herein, a service refers to distributed computing systems which provide computing functions to various client devices, such as the depicted AR devices 102*a,b*. Services may, for example, be implemented by a combination of web server(s) 1206 and application servers 1208, as depicted in FIG. 12.

In an embodiment, the depicted system renders augmented reality gameplay which incorporates a physical surface. Incorporation of the physical surface, in various embodiments, refers to the generation of an augmented reality display that involves the physical surface. For example, virtual reality elements may be generated and displayed on or above the physical surface. Note that the use of the term "surface" should not be construed as being limited to two-dimensional surfaces. For example, a surface may have a complex three-dimensional geometry, possibly including a three-dimensional area in physical space. For example, a game surface might include a hill, boulder, or similar landscape feature, and might include the air above the landscape feature.

In at least one embodiment, the rendering of the augmented reality gameplay, incorporating the physical surface, is based on output of a game engine. As described in more detail below, a game engine service 122 may maintain and periodically update, or output, a game state that can be used, directly or indirectly, by a rendering service 124.

In at least one embodiment, a rule set is used by a game engine. A rule set may include information describing various aspects of the gameplay, in a format usable by the game engine to implement the game. This refers generally to information which allows the game engine to process game input, apply it to the current state of the game, and output a new state for the game. The rule set may also comprise additional information describing the various game elements, indicating how those elements might be used, how they might be rendered, and so forth. A rule set, in at least one embodiment, includes information indicating which aspects of gameplay can be localized, and may further include information indicating how such localization should be accomplished. For example, the rule set might contains data indicating which cards used in gameplay have localizable text on them, and may also provide translations of the text in various languages.

In an embodiment, a prospective change to the game state is identified based at least in part on an observation of a physical object, such as one of the depicted stand-in objects 106, on a play surface, such as the depicted play surface 104. The observation may be conducted based on video data of the play surface 104 collected by one or more of the AR devices 102a,b. The movement of the objects can be tracked, and a prospective change to the game state identified based on the tracked movement. The movement can be indicative of a change to the game state, as might be the case when an object representing a game piece is moved from one location to another. Accordingly, the system may identify prospective changes to the game state based on the tracked movement. The prospective change can then be validated based on the rule set, and then applied to the game state.

One of the AR devices 102a observes a play surface 104 on which a fiducial marker 108 has been placed. Here, the fiducial marker 108 refers to an object which includes a characteristic which can be identified by the system and used to identify a game corresponding to or otherwise associated with the characteristic. In some cases, the characteristic may be the shape of the object. For example, a pawn or knight from a chess game can be associated with the game of chess. In other cases, the characteristic might be an identifier, such as a bar code or other printed matter, which can be used by the system to look-up the associated game.

In an embodiment, the AR device 102a uses one or more of its sensors, such as its camera, to read a code imprinted on the fiducial marker 108. The AR device 102a provides this information to the system services, such as the object recognition service 120 or game engine service 122. Using this information, the system 100 then identifies a game associated with the fiducial marker 108. For example, the fiducial marker 108 might be a card whose code corresponds to a game of chess. When a user lays down the card onto the play surface 104, the AR device 102a obtains the code from the card, transmits it to one of the services 120, 122, and the system thereby determines that a game of chess should be initiated. Other cards might be associated with other games, such as checkers, backgammon, poker, a particular board game, a role-playing game, and so on.

Once the game has been identified, the game engine service initializes a virtual game state associated with the physical game. The total game state is represented by a combination of physical state (e.g., the position of physical objects on the play surface 104) and virtual state. In some cases, stand-in objects 106 are used to represent aspects of the physical state of the game. For example, the stand-in objects 106 might represent player characters in a role-playing game, or pawns in a game of chess.

The game engine service 122 uses sensor input from the AR devices 102a,b as input for calculating a subsequent game state. For example, input from the AR devices 102a,b might be used to collect information indicating what actions are taken by the players for each turn in the game. This can include the manipulation of the stand-in objects 106 on the game surface. Various other devices and modes of input may also be used, such as the selection of a menu item placement of tokens on the game surface, voice commands, physical gestures, and so forth.

The game engine service 122 causes or assists the rendering service 124 in generating aspects of the augmented reality display produced by the AR devices 102a,b. For example, the rendering service 124 can render graphics for game objects such as chess pieces, figurines, dice, cards, and so on. These graphics can then be incorporated into what is displayed on the screens of the AR devices 102a,b. More complex graphics, such as a complete view of a chess board, a fully-rendered battlefield, and so forth, may also be produced by the rendering service 124.

The graphics produced by the rendering service 124 can be based on the current game state. For example, the game state might represent the position of characters on a battlefield, which can then be rendered, by the rendering service 124, for each AR device. It will be appreciated that the scene required for each AR device may be different, due to differences in each player's perspective.

In an embodiment, the rendering of the gameplay is be based in part on an object tracking mechanism. This may include, in some cases, continuous object tracking performed independently of game turns. For example, one of the stand-in objects 106 might be a simple token in the physical world, but rendered in AR as a complex and detailed figurine. The system 100 may continuously track the position of this token as it is moved about the board, so that it remains depicted in AR as a figurine, rather than as a simple token. This may be accomplished by the depicted object and player recognition service 120.

The system 100 may provide various other features to facilitate and enhance gameplay. These may include, for example, providing enforcement or guidance regarding rules, providing supplementary information to players, allowing information to be shared with players on the same team, but not other players, calculating game scores, rolling virtual dice, and so on.

In some cases, the play surface 104 is a mat, cloth, or other similar two-dimensional surface. The play surface 104 may in some instances be relatively plain or feature-less, in order to minimize interference with the rendering of augmented reality assets within the scene. The play surface 104 may in some instances have patterns, colors, or other features imprinted on it, in order to assist with sensor calibration and object rendering.

In some cases, the play surface 104 is a three-dimensional structure, such as a board or table on which additional elements have been placed. For example, blocks, bricks, columns, or other objects may be treated by the system as part of the play surface. As discussed in more detail herein, various services, such as an object and player recognition service 120, may distinguish between an object intended to be a portion of the play surface 104, an object intended to be a fiducial marker 108, and an object intended to be a stand-in object 106. Objects may, however, be utilized for more than one such purpose.

In some cases, the play surface 104 corresponds to some or all of the game that is to be played. For example, a physical chessboard might be used to play an AR-enhanced game of chess. Similarly, an AR-enhanced wargame might be played with a mat on which hexagonal markings have been imprinted. However, the experience of playing these games may be enhanced in AR by the integration of additional elements. For example, terrain features rendered in AR might be projected onto the mat to enhance the wargame, and the physical chessboard might be rendered in AR to seem to be much larger in AR than it actually is in physical terms.

In some cases, a fiducial marker 108 is an object, such as a card or token, on which information is imprinted. For example, a fiducial marker 108 may be a card on which a quick response ("QR") code is imprinted. In other cases, the fiducial marker 108 may be an object containing a radio-frequency identifier ("RFID") or other mechanisms with which a device, such as an AR device 102, may obtain information from. The fiducial marker 108 may have various additional properties used by the system 100 to facilitate the provision of AR services to enhance gameplay. For example, in some cases a fiducial marker 108 may have a unique code which can be mapped to an account or owner. In an embodiment, this information is used to identify both the game to be played as well as additional information, such as saved games, player preferences, and so forth.

The fiducial marker may also be used to facilitate the generation of the augmented reality display. In an embodiment, the fiducial marker 108 is of a known size, which facilitates the determination of scale information for other objects observable through an AR device. For example, the system 100 can use the known size of an observed fiducial marker 108 to determine the size of the play surface 104, when both are captured by an AR device or camera. For example, in some cases a fiducial marker 108 may include visual patterns or colors that can be observed by the camera of an AR device 102a,b and used to perform calibration of the camera. For example, a white balance correction might be performed based on a pattern observed on a fiducial marker 108.

The stand-in objects 106 may be used in gameplay. These may correspond to game pieces, game hazards, walls, barriers, and so forth. The stand-in object may also have properties used by the system 100 to facilitate the provision of AR services to enhance gameplay.

For example, in some instances, a stand-in object may have a unique identifier which allows it to be mapped to a specific game object. For example, a pack of cards might be provided as stand-in objects, and each card might have a unique identifier on it. The identifiers might be globally unique (e.g., a randomly generated string of alphanumeric characters that is sufficiently long to practically eliminate the chance of collision) or locally unique. For example, the cards in a simple pack of playing cards might each be considered to have a unique identifier. In an AR-assisted game, a jack of clubs might correspond to a tank, a ten of diamonds might correspond to an infantry unit, and so on.

Similarly, a stand-in object may have visual characteristics that can be used to facilitate its use in AR-enhanced gameplay. For example, chess pieces might be used as stand-in objects. A pawn might represent an army private, a knight a lieutenant, and so on.

For example, in some instances, a stand-in object might directly correspond to its role in the game. For example, in a chess game a rook may still correspond to a rook in an AR-enhanced game, but can still described as a stand-in object. Note that in this case, the visual characteristics of the object (in this example, a rook) allow the system to identify it as a rook.

As suggested above, the system 100 may employ a federation of services to provide AR-enhanced gameplay. These may include an object and player recognition service 120, a game engine service 122, a rendering service 124, and a variety of additional services 126-136.

An object and player recognition service 120 provides functionality related to classifying and identifying objects and people. Classification refers to determine what class of objects an observed object belongs to. For example, classification might include determine whether an observed object is a person or thing, is a fork, a knife, or a spoon, and so on. With respect to objects, identification refers to determining the particular identity of an object. For example, identifying a person may involve determining the name of an observed person, and identifying a stand-in object may involve determine which particular stand-in object has been observed. Identification may be done on a global basis or a local basis. For example, a person might be identified globally by determining that person's name and address, or locally by determining that the person is identified as "Player One."

A game engine service 122 provides functionality related to managing and updating game state. As already indicated, game state typically involves a combination of physical and virtual game state. The game engine service 122 maintains a record of this combined state. The game engine service 122 also receives input for each turn of the game (although in AR-assisted gameplay, the concept of turn may sometimes be loosened more than is typically possible in conventional, physical gameplay), and calculates a subsequent game state. Where necessary, the game engine service 122 may also assist in updating the physical game state. For example, the game engine service 122 may send instructions, to be displayed via the AR devices 102, to move certain pieces or to remove other pieces from the play surface 104.

A rendering service 124 provides graphical rendering capabilities, as needed to produce visual elements of the AR scene displayed by the AR devices 102a,b. This may include rendering of individual objects, partial scenes, or full scenes. In various cases and embodiments, graphics rendered by the rendering service 124 are integrated into visual data captured by the AR device, in order to produce the final, integrated, AR scene. The rendering service 124 may perform the integration in some cases and embodiments, while in others the integration is performed by the AR device 102. The amount of rendering performed by the service 124 may depend, in some cases and embodiments, on the computing capabilities of the AR device 102.

A game state service 126 may provide for storage and retrieval of game state information. In an embodiment, the game state service 126 storages and retrieves game state information based on a composite index of the identity of the player, identity of the game, and a time or turn indicator. This allows retrieval of the current game state or storage of a subsequent game state, as well as the retrieval of a history of games states. The latter may be used, for example, to enable rewinding the game state to an earlier time, or to enable a reply of the game state. In an embodiment, the game engine service 122 provides the game state information to the game state service 126 for storage. When a game is restored, the information is loaded by the game state service 126 and used to initialize the game state for use by the game engine service 122.

A rules library 128 provides for the storage and retrieval of rules for the various games. In this context, the term "rules" refers to the information needed by the game engine service to facilitate gameplay. For example, the rules can comprise scripts that can be leveraged by the game engine to calculate a subsequent game state based on a current game state, parameters for describing permissible movement of game pieces, and so forth.

An information management and sharing service 130 provides for distributing information to the game players (and potentially to others) in a controlled manner. For example, each player in the game may be assigned to a team. The information management and sharing service 130 can be used, for example, to provide information to the AR devices 102a,b of the players on one team, but not to players on the other teams. The information management and sharing service may store and retrieve information based on composite indexes such as game, player, and team number. In some instances, further restrictions are applied, such as based on an "information zone" that the player is in. These techniques may be employed to enforce "fog of war" features, for example. In various embodiments, the game engine service 122 interacts with the information sharing and management service 130 to provide these features.

A game asset library 132 provides the digital assets needed to render a game. These assets may include wireframes, textures, bitmaps, audio files, and so forth. These may be stored and retrieved, e.g., by the asset library 132 at the request of the rendering service, based on the game being played. The game asset library 132 may also provide storage and retrieval services for assets needed for expansions or customizations of the game. For example, data for player-specific "skins" might be stored by the service. The game asset library 132 may employ various optimizations in order to provide the rendering service 124 with the assets its needs to render graphics efficiently, e.g. by employing techniques designed to minimize load times, etc.

A personalization service 134 provides data or other assets for personalizing gameplay. As described herein, personalizing gameplay comprises adjusting gameplay to account for factors such as player skill level, player preferences, house rules, and adjustments to localize the game to another culture, geographic region, or language.

In an embodiment, the personalization service 134 acquires data and performs computations for determining player skill level. For example, the personalization service 134 may monitor a player's participation or performance in a particular game, and make an assessment of that player's skill. The assessment may be made using any of a variety of machine learning techniques, by statistical methods, or by other methods. This assessment can then be used by the system as a basis of providing assistance to the player. The assistance can be provided through a variety of means, such as through hints, through the additional of game elements (such as extra game units), and so forth.

In an embodiment, the personalization service 134 stores and retrieves rules data. The personalization service, in the embodiment, provides the game engine service 122 with rule data, or other assets, that are applied by the game engine service 122 to adjust gameplay according to the intended level of personalization. This can include personal rules or house rules. These allow for the game experience to be customized for some or all of the players. The game engine can track these variations and apply them to the actions taken by the players. For example, the game engine may determine not to enforce an advanced rule against a beginning player, or may subject certain players to game mechanics better suited to those with more advanced skills. Applying the rules, in this context, can comprise identifying a potential player action, examining the action with respect to a set of rules deemed applicable to the player, and then permitting, altering, or refusing the player action in accordance with those rules. The game engine can then update the game state as appropriate.

A localization service 136 provides data or other assets for localizing gameplay. As described herein, localizing gameplay comprises adapting gameplay, including in some cases visual or audio aspects of gameplay, to account for an individual player's location, culture, or language. The localization service may provide capabilities for associating localization preferences with particular user. The localization service 136, in various embodiments, stores and retrieves assets related to localization, such as textual data in various languages, graphical elements, instructions for adjusting gameplay, and so forth. For example, physical cards containing textual portions printed in English might be rendered in augmented reality using French, Spanish, or some other language.

Figure 2:
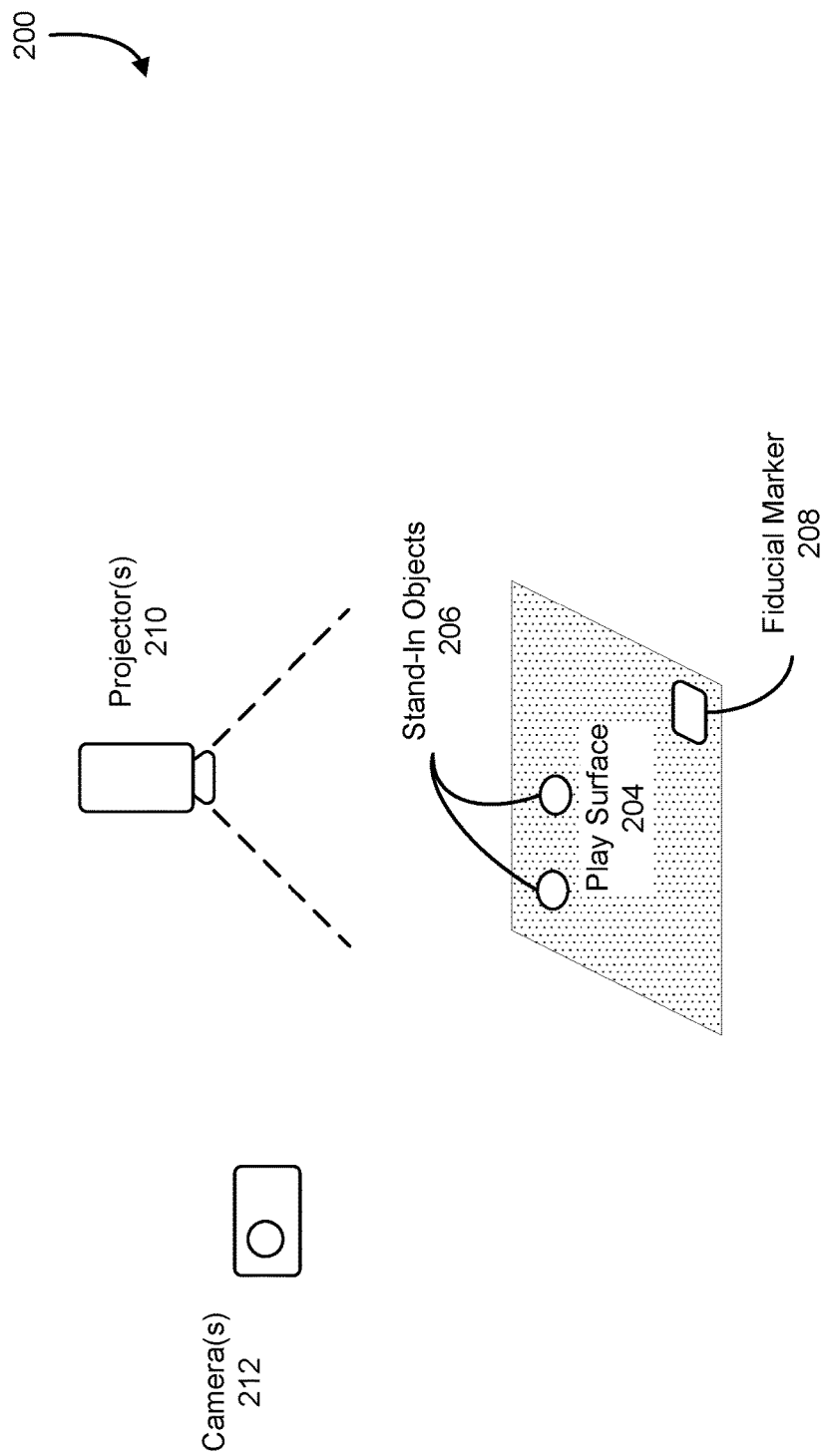
FIG. 2 illustrates an example of an embodiment of an augmented reality enhanced gameplay system, in accordance with an embodiment.

FIG. 2 illustrates an example of an embodiment of an AR-enhanced gameplay system 200. As illustrated in FIG. 2, the system 200 can comprise a play surface 204, stand-in objects 206, and a fiducial marker 208. These may correspond to the play surface 104, stand-in objects 106, and fiducial marker 108 depicted by FIG. 1. The system 200 may further comprise one or more projector(s) 210 and camera(s) 212.

In an embodiment of the depicted system 200, the camera(s) 212 are mounted or positioned within a room so that they are able to observe the play surface 204 and any objects placed thereon. The camera(s) 212 may be a device comprising optical sensors to capture images of the play surface. The camera sensors may operate in the visible wavelengths, infrared wavelength, or other wavelengths. Examples of a camera include dedicated optical devices such as cameras or webcams, or multi-purpose devices such as smartphones, tablets, and so on.

The projector(s) 210 are devices that convert input signals to visual output. In an embodiment, the projection is two-dimensional. The projector(s) 210 project a two-dimensional projection onto the play-surface 204. By calibrating the dimensions of the play surface 204 and stand-in objects 206 using the fiducial marker 208, the system 200 is able to align the projection onto the stand-in objects 206 and play-surface 204. This is due at least in part to the ability to calibrate the projection using per-determined characteristics of the fiducial marker 208.

The projected image may therefore transform blank surfaces on the stand-in objects 206 and play-surface 204. For example, an image might be projected onto a blank token to transform it into a character in the game. Likewise, terrain features might be projected onto the play surface 204.

In an embodiment, a plurality of two-dimensional projections are used, based on a plurality of projector(s) 210 positioned at strategic angles. This allows projections onto three-dimensional surfaces.

In an embodiment, the projector(s) 210 are three-dimensional or holographic projectors.

FIG. 3 illustrates an example 300 of selective information sharing to enhance an adversarial game. In the example 300, an AR-Enhanced Game Board 304 is generated using the systems depicted in FIG. 1 or FIG. 2. The game board is observed by the AR devices 302a,b. Each AR device 302a,b generates an augmented reality scene comprising the AR-Enhanced Game Board 304. In addition, each AR device 302a,b displays additional information to its user. For example, consider that the user of a first AR device 302a might be "Player One" in a game, and might be on "Team One" in the game. Similarly, the user of a second AR device 302b might be "Player Two" in the game, and a member of "Team Two."

The displays generated by the AR devices 302a,b might also be based in part on knowledge possessed by the player utilizing the device. This knowledge may include, for example, information indicating the status of an ally, information about the area in which a player is currently located, an estimate of an opponents status (e.g., an estimate of the amount of "hit points" an opponent has remaining), and so forth.

More generally, the augmented reality scene displayed to the user can be adjusted in accordance with that player's "zone of knowledge." In at least one embodiment, secret information is organized as zones of information. One zone might correspond, for example, to information available only to a particular player. Another zone might correspond to information available only to a team. Another zone might be available only to players in a particular region of the game.

In embodiments, the augmented reality scene generated for each player's is adjusted in accordance with these zones. In an embodiment, by the game engine determine what constitutes each player's zone of knowledge and providing, to the augmented reality rendering components, the information to be rendered for a particular player.

The display generated by the first AR device 302a might display shared information 310, which is also generated by the second AR device 302b. In addition, the first AR device 302a might generate a display of secret information 306a that is only presented to "Player One." Likewise, the first AR device 302a might generate a display of secret information 308a that is only presented to members of "Team One." The second AR device 302b may likewise display player-specific secret information 306b and team-specific secret information 308b to "Player Two."

Figure 4:
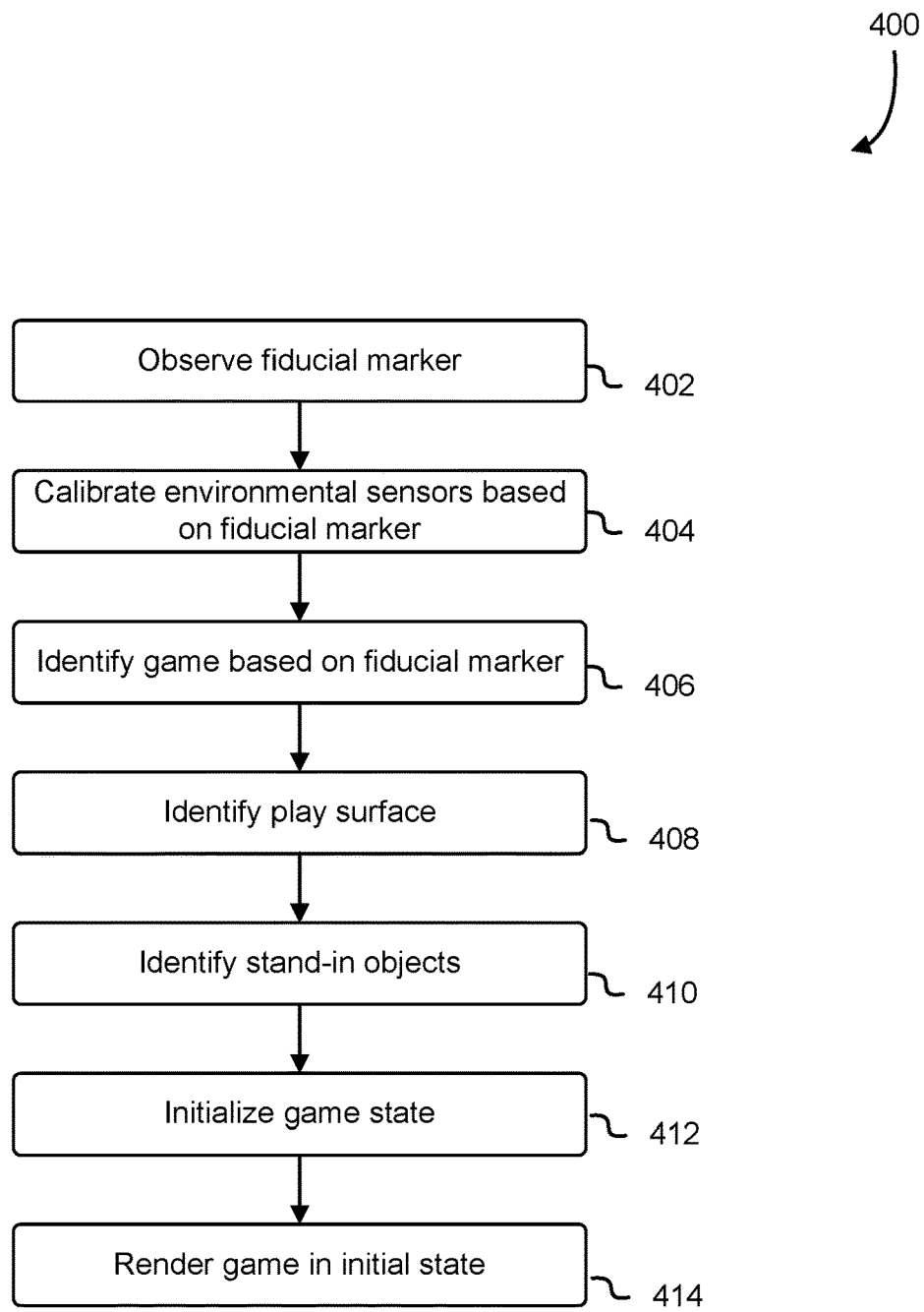
FIG. 4 is a flowchart illustrating an example of a process for initializing an AR-enhanced physical game, in accordance with an embodiment.

FIG. 4 is a flowchart illustrating an example of a process 400 for initializing an AR-enhanced physical game, in accordance with various embodiments. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 400 may be performed by any suitable system, such as a server in a data center, by various components of the environment 1200 described in conjunction with FIG. 12, such as the one or more web servers 1206 or the one or more application servers 1208, by multiple computing devices in a distributed system of a computing resource service provider, or by any electronic client device such as the electronic client device 1202. In various instances, the services depicted in FIG. 1 operate on the web servers 1206 and application servers 1208 depicted in FIG. 12.

The process 400 includes a series of operations wherein an AR-enhanced game is initialized based on the observation of a fiducial marker.

At 402, a fiducial marker is observed by an AR device. This may be done using the techniques described with respect to FIG. 1.

At 404, environmental sensors are calibrated based on the known properties of the fiducial marker. This may be done using the techniques described herein, including with respect to FIG. 1.

At 406, the game is identified based on the fiducial marker in accordance with the techniques described herein, including with respect to FIG. 1.

At 408, the play surface is identified. This may comprise identifying the area of physical space in or on which the game will be played. In some instances, a mat or game board is utilized. Other potential surfaces include a dining-room table, desk, or floor. The identification of the play surface may comprise identification of its dimensions, which may be informed by the sensors calibrated using the fiducial marker. For example, the size of the fiducial marker may be compared to the size of an observed table, in order to determine how big the table is.

At 410, stand-in objects are identified. Identification of a stand-in object may include identifying a category or identity of the object in order to correlate this information to the role the stand-in object will serve in the game. In an embodiment, a visual hash is calculated to serve as a unique identifier of the object and to allow it to be tracked as it is moved around the game surface. This approach may be combined, in some embodiments, with other tracking techniques in order to improve continuity of identification.

At 412, the game state is initialized. This step may comprise a number of sub-operations. For example, the game state may be initialized by identifying the players, determining license rights associated with the players (e.g., expansions owns by the players), retrieving rules for the identified game, loading expansions, allocating a game engine, retrieving any saved state information, and initializing the game engine based on the rules and saved state. The initialization process may further comprise loading graphical and audio assets from a game asset library, for use by a rendering service. These assets may comprise bitmaps, audio files, and so forth.

At 414, the game is rendered in its initial state. This may, for example, involve a rendering service working in conjunctions with the AR devices to generate augmented-reality scenes in which the stand-in objects and play surface have been replaced by their augmented-reality counterparts. Virtual-only elements can also be included in the scene. In an embodiment, video frames for the scene are rendered by a rendering service, such as the rendering service 124 depicted in FIG. 1, and transmitted to an AR device for display to a user.

Figure 5:
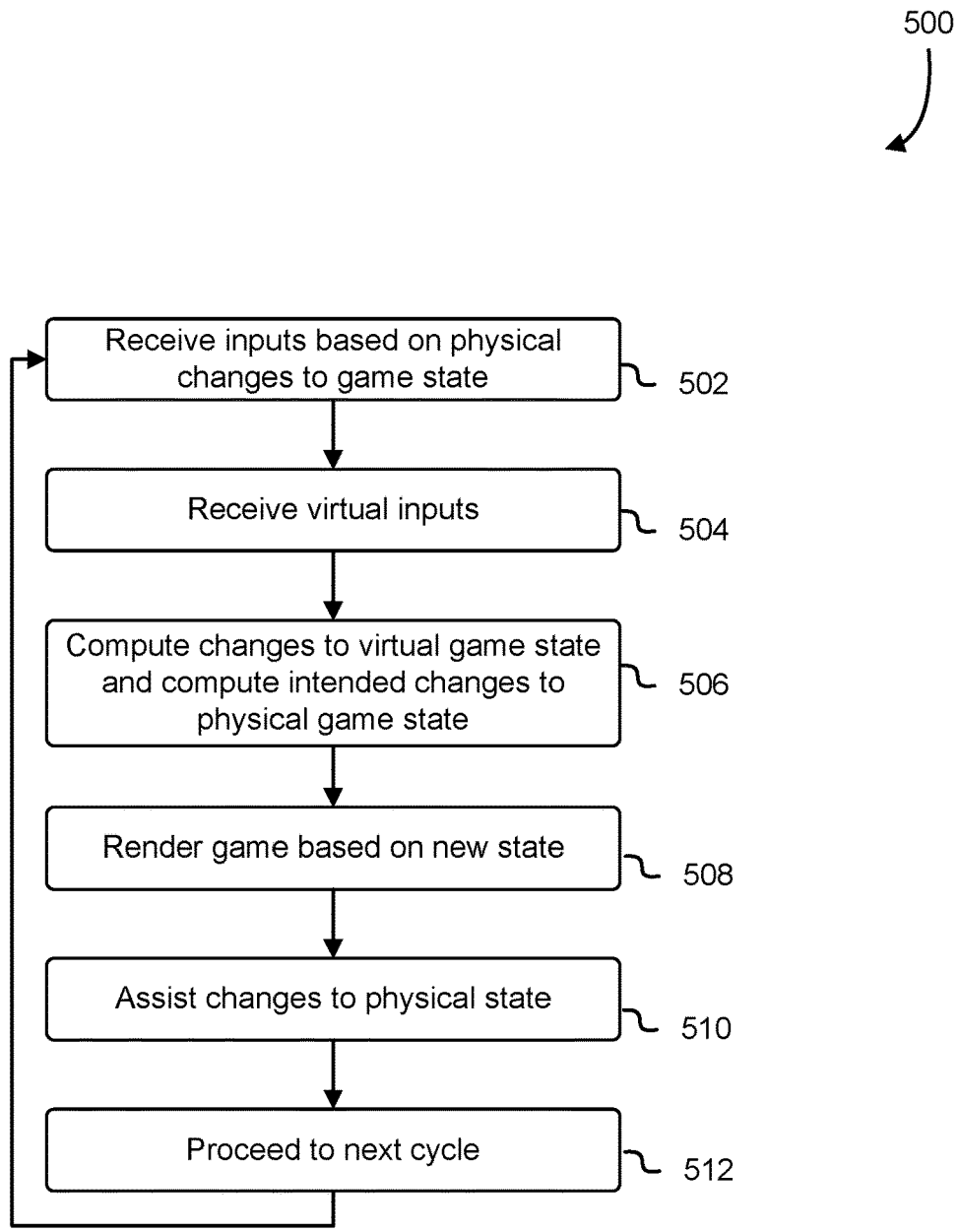
FIG. 5 is a flowchart illustrating an example of a process for computing AR-assisted game states, in accordance with an embodiment.

FIG. 5 is a flowchart illustrating an example of a process 500 for computing AR-assisted game states, in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 500 may be performed by any suitable system, such as a server in a data center, by various components of the environment 1200 described in conjunction with FIG. 12, such as the one or more web servers 1206 or the one or more application servers 1208, by multiple computing devices in a distributed system of a computing resource service provider, or by any electronic client device such as the electronic client device 1202. In various instances, the services depicted in FIG. 1 operate on the web servers 1206 and application servers 1208 depicted in FIG. 12.

The process 500 includes a series of operations wherein a game engine calculates game states to facilitate AR-enhanced physical gameplay. As described herein, a process for facilitating AR-enhanced physical gameplay may comprise operations for obtaining player input, updating a game state in accordance with the player input, game rules, and other factors, and rendering an augmented reality scene consistent with the updated game state.

At 502, the game engine receives inputs based on physical changes to the game state. For example, stand-in objects may have been moved or added to the playing surface. Examples of such actions include moving a stand-in object representing a chess piece, adding a figuring to represent a new foe, and so forth. Note, however, that the forms of input are not necessarily limited to the manipulation, addition, or removal of stand-in objects. For example, other physical changes such as a change in lighting condition, music, physical gestures, and so forth can all be forms of input. The passage of time might also be treated as a physical change to the game state, and used as a form of input.

At 504, the game engine identifies other forms of input, such as input received via player gestures detected by the AR device, vocal commands detected by the AR device, menu selections, and so forth. Inputs might also be based on messages received from any of a variety of sources, such as other games.

At 506, changes to the virtual game state are computed based on the inputs, as are intended changes to the physical state. The virtual changes can include calculating game effects, calculating the positions of objects that exist only virtually, and so forth. The intended changes to the physical state includes changes to the physical state that should be performed in order to make the overall state of the game consistent. For example, it may be determined that an enemy unit has been destroyed. If that unit is represented in the game by a physical token, e.g., a stand-in object, that token should be removed from the board.

At 508, the game is rendered based on the newly calculated state, and displayed on the AR devices. The rendering may be performed using the techniques described herein, including those described with respect to FIG. 1.

At 510, the game engine interfaces with other components of the system to assist any needed changes to the physical state. For example, the game engine might generate a set of instructions that are to be displayed to the users, via their respective AR devices. The game engine may also facilitate verification of the physical changes, to ensure that the physical environment has been modified to match whatever requirements are imposed on it by the changes to the virtual game state.

At 512, the game engine proceeds to the next cycle. In an embodiment, the game state is recorded during each cycle, or during selected cycles, in order to facilitate a subsequent replay of the game or a subsequent restoration of the game. In an embodiment, the game state is transmitted, for each or selected cycles, to another device or computing system, to facilitate remote viewing of the gameplay.

Figure 6:
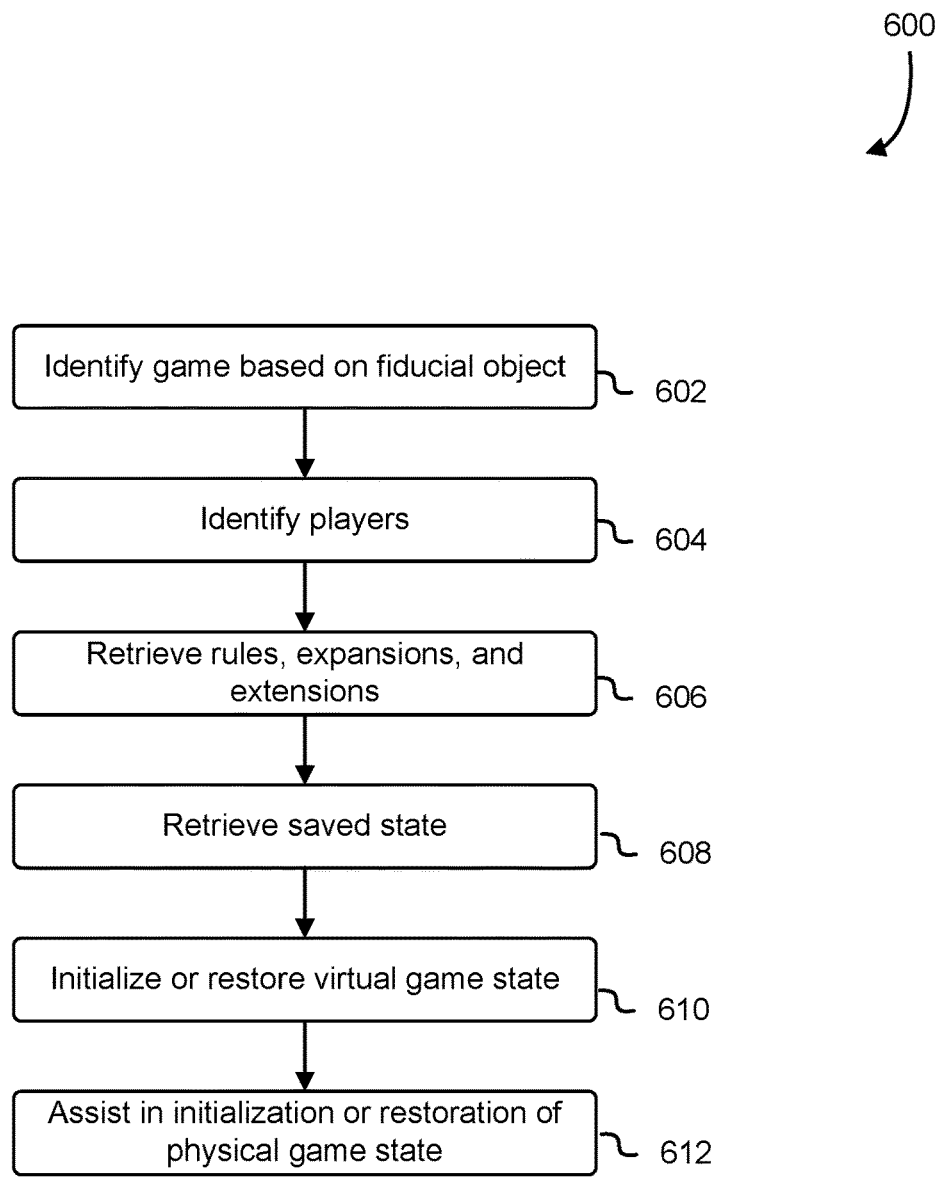
FIG. 6 is a flowchart illustrating an example of a process for initializing an AR-enhanced physical game, in accordance with an embodiment.

FIG. 6 is a flowchart illustrating an example of a process 600 for initializing an AR-enhanced physical game, in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as a server in a data center, by various components of the environment 1200 described in conjunction with FIG. 12, such as the one or more web servers 1206 or the one or more application servers 1208, by multiple computing devices in a distributed system of a computing resource service provider, or by any electronic client device such as the electronic client device 1202. In various instances, the services depicted in FIG. 1 operate on the web servers 1206 and application servers 1208 depicted in FIG. 12.

The process 600 includes a series of operations wherein a game is set up or restored to a desired state, so that game play can commence or be continued.

At 602, the system identifies the game based on a fiducial object or marker place on a playing surface. This may be accomplished using the techniques described herein, including those techniques described in relation to FIG. 1.

At 604, the system identifies the players. This may be accomplished using the techniques described herein, including those techniques described in relation to FIG. 1. The subsequent retrieval of a game state may be based on this identification, such that games in which a player owns or was involved in can be made available and selected by the player for restoration.

At 606, the system retrieves the rules of the game, as well as the rules of any associated expansions or extensions to the game. Note that here, the term rules refers to data and instructions usable by a game engine to facilitate the enhanced gameplay, rather than the traditional text-based rules that might be provided to a player.

Various licensing requirements may be considered to determine if an expansion or extension should be retrieved and applied to gameplay. For example, a game might require that at least one participating player have purchased a license to an extension. In another example, a player may have established various "house rules" that should be applied to the game, but only when that particular player is involved.

At 608, the system retrieves state information associated with the game and the identified player(s). For example, the game might have been previously saved, and its players may wish to resume gameplay from the save point. A unique ability of AR-assisted gameplay is the facilitation of "save points" for a physical game. For example, in an embodiment, the system retrieves a previously stored game state, provides information and hints for restoring the physical game to that state, and facilitates subsequent gameplay. Virtual components of the game can be automatically restored.

At 610, the virtual game state is either initialized or restored based on a save point. This may comprise retrieving the relevant game data associated with the save point, allocating a game engine, and initializing the game engine in accordance with the state.

At 612, the system assists in the initialization or restoration of the physical game state. For example, if a game of chess is commencing, the system might help the players by ensuring that the various pieces are properly placed in their starting positions, or in the positions associated with the save point.

The system can also assist in the restoration of a prior physical game state by providing information in augmented reality regarding where pieces should be placed. For example, the system might display augmented reality markers at various points on the play surface, in order to indicate where a token should be placed, and what type of token is required.

Figure 7:
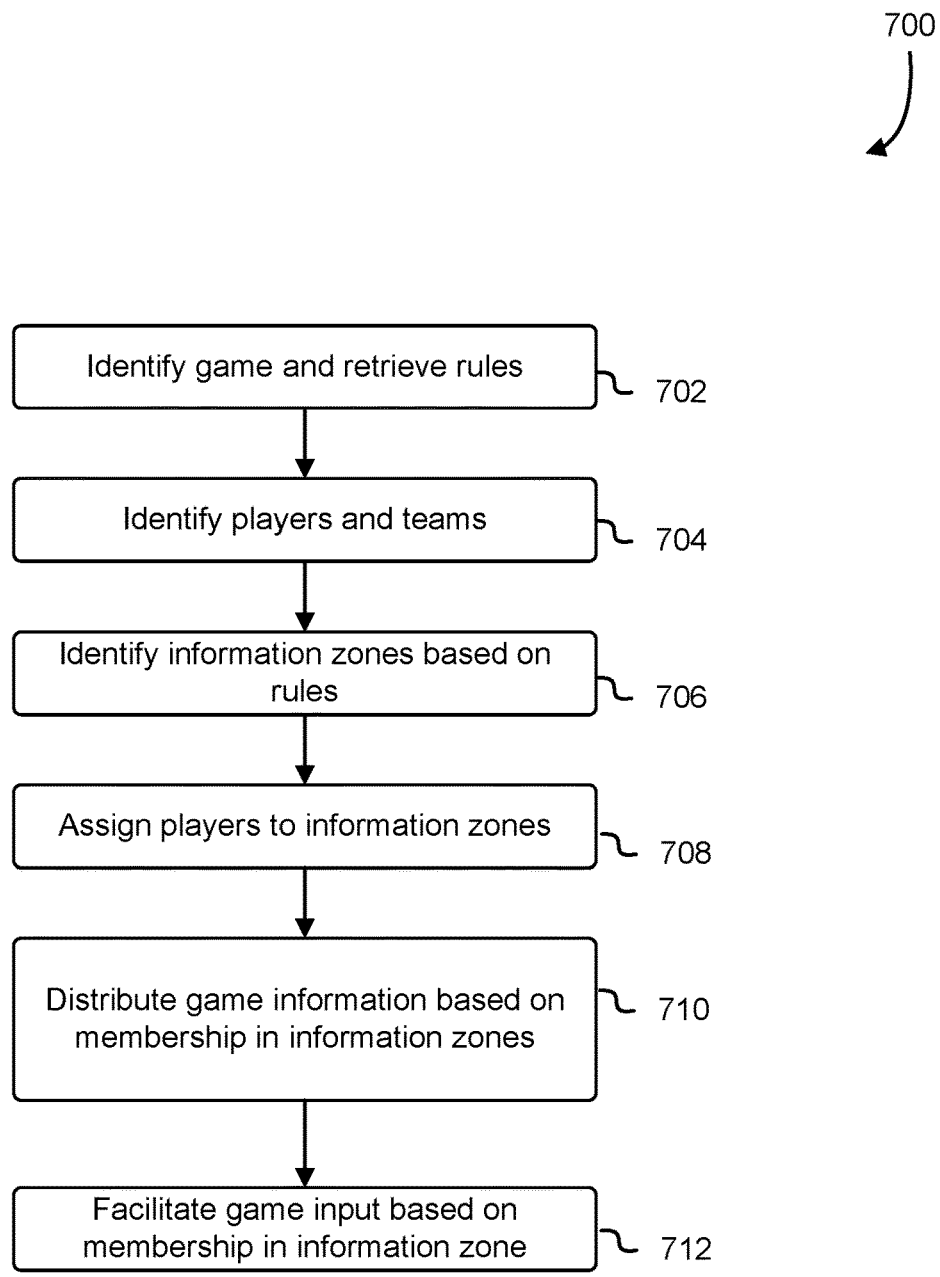
FIG. 7 is a flowchart illustrating an example of a process for distributing information to game participants, in accordance with an embodiment.

FIG. 7 is a flowchart illustrating an example of a process 700 for distributing information to game participants, in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 1200 described in conjunction with FIG. 12, such as the one or more web servers 1206 or the one or more application servers 1208, by multiple computing devices in a distributed system of a computing resource service provider, or by any electronic client device such as the electronic client device 1202. In various instances, the services depicted in FIG. 1 operate on the web servers 1206 and application servers 1208 depicted in FIG. 12.

The process 700 includes a series of operations wherein information is compartmentalized and distributed according to game criteria.

At 702, the system identifies the game being played and retrieves rules for the game. The game rules may include various elements related to the compartmentalization of information to be distributed in the game. Examples include rules to indicate how fog-of-war is handled, how information is shared between team members, and so forth.

At 704, the system identifies the players of the game, as well as any teams and the associations between the players and the teams. The system may further track correspondence between the players and objects on the physical game surface, so that the system may determine which tokens are controlled by which player.

At 706, the system identifies information zones based on the rules. An information zone refers to a type or category of information, as defined by the gameplay rules and gameplay state. The information made available to a particular player might be described as the intersection of the rules and state. For example, in a roleplaying game, there might be an information zone associated with a character's position. The area might be affected by various rules and game states, such as whether or not the character has a torch or flashlight. The position of a monster might be included in an information zone if it would be visible under these game conditions, but excluded otherwise.

Another example of an information zone is one based on team membership. For example, an information zone might be based on team membership, so that all of the members of "Team One" are included in the same information zone, but players not on "Team One" are excluded.

At 708, players are assigned to information zones based on the aforementioned criteria. Note that this may be an ongoing process, since membership in an information zone can change based on changes to the game state. For example, the game engine might determine that a character's position has change (e.g., by observing movement of a corresponding stand-in object), and thereby determine to include or exclude that character from an information zone.

At 710, game information is distributed based on membership in the information zones. In an embodiment, the game engine causes the rendering component to include the information in the augmented reality display of the appropriate users, or trigger some other means of providing the information. For example, the game engine might cause a first player's device to emit "mood" audio associated with a particular location, or cause another user's heads-up display to be updated to include messages from that player's teammates.

At 712, the system facilitates game input based on membership in an information zone. Alternatively, the system facilitates based on team membership alone, or in combination with information zone. For example, player's whose characters are within the same zone and who are on the same team might be permitted to coordinate their actions for the next turn. Similarly, opponents who are in the same zone might receive hints as to the opposing team's actions, when characters on the opposing team are communicating within the opponent's range of hearing.

Figure 8:
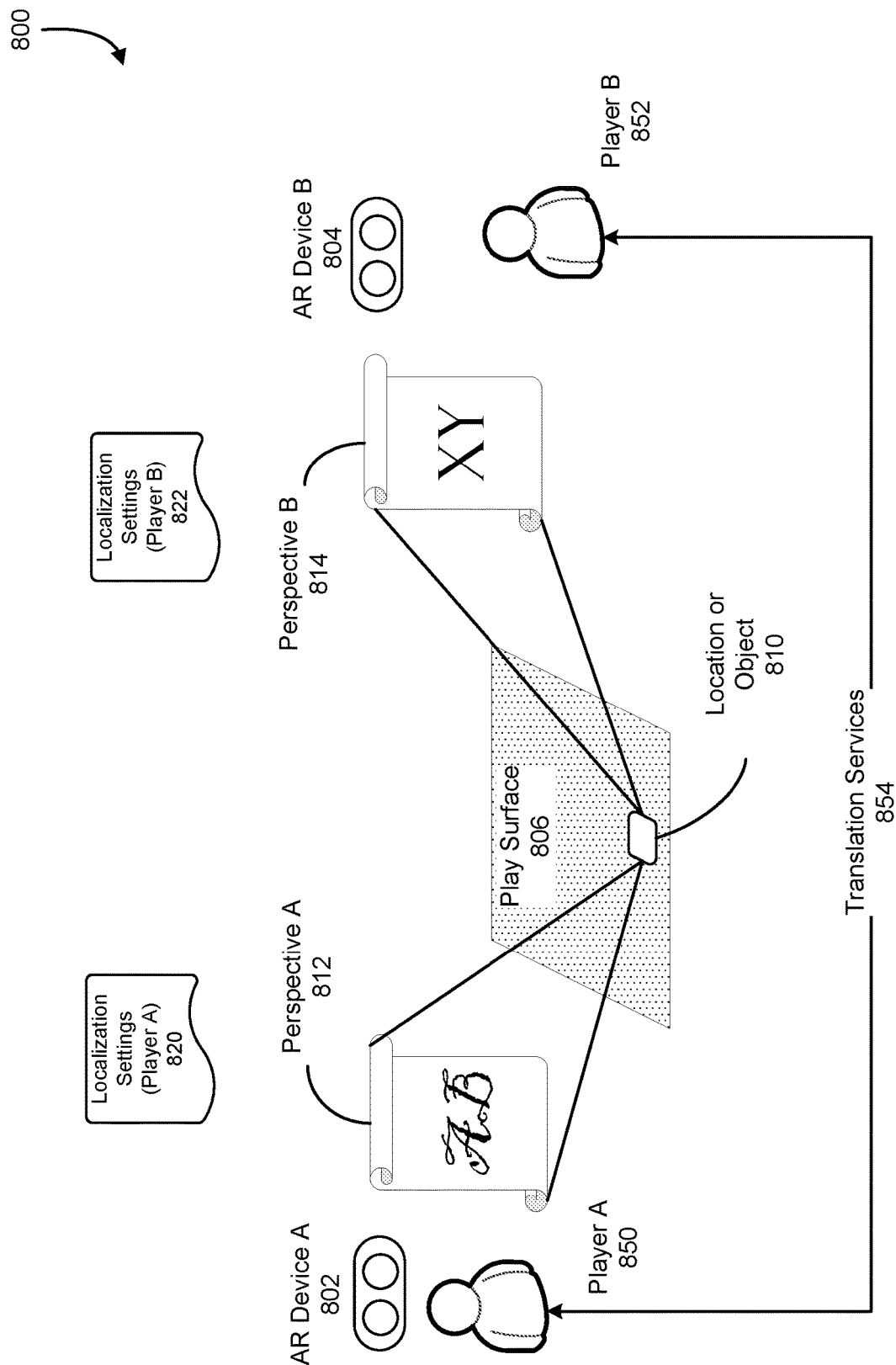
FIG. 8 illustrates an example of an embodiment of an augmented reality enhanced gameplay system incorporating localization aspects, in accordance with an embodiment.

FIG. 8 illustrates an example of an embodiment of an augmented reality enhanced gameplay system incorporating localization aspects, in accordance with an embodiment. In the example 800 of FIG. 8, a play surface 806 is observed by two players "A" 850 and "B" 852, operating respective AR Devices "A" and "B" 802, 804. The AR Device "A" 802 may generate a view of the play surface 806 from a player A's perspective 812, and the AR Device "B" 804 may generate a view of the play surface 806 from player B's perspective 814. As For the purposes of the example, player "A" may be assumed to be associated with a first set of localization settings 820, and player "B" may be assumed to be associated with a second set of localization settings 822. The example 800 of FIG. 8 describes aspects of embodiments that localize game elements in accordance with each player's localization preferences. Examples of localizing game elements include adapting instructions to a player's language requirements, adjusting currency values to a denomination a player is familiar with, and so forth.

In an embodiment, localization settings 820, 822 refer to data indicative of the language preferences of the respective player. For example, the play surface 806 as rendered by AR Device A 802 might be rendered such that locations or objects 810 on the board are rendered with labels in the French language, whereas the same locations or objects 810 on play surface 806 might be rendered by AR Device B 804 using English language labels.

In an embodiment, localization settings 820, 822 refer to localization-related gameplay adaptations of the respective player. For example, in a board game where the players exchange a pretend currency, the currency for player "A" might be rendered and treated in the game as French francs, whereas the currency for player "B" might be rendered and treated in the game as U.S. dollars. In some cases, the gameplay might be further adapted based on these differences, such as by incorporating an "exchange rate" between the different currency types. The rendering of gameplay in accordance with a localization preference is based, in various embodiments, on the rule set. A rule set, in such embodiments, may identify gameplay elements—such as cards, spots on the board, instructions, and so forth—that may require localization. These may include, but are not necessarily limited to, the textual elements of a game. The rule set, for example, may identify cards used in a game, or spots on the game board, that include textual elements that can be localized to accommodate the language needs of a particular player. A game engine, in an embodiment, is made cognizant of the localizable elements of a game based on the rule set, and takes appropriate steps to cause those elements to be rendered, by a rendering service, using the appropriate localization preferences.

Localization services may also include translation services 854, facilitating communication between players speaking different languages. In embodiments, the translation services 854 includes spoken word translation. In embodiments, the translation services 854 include translation of gameplay elements that are expressed in a localized manner. For example, in game which involves bartering or trading, terms offered by one player in terms of French Francs might be expressed to another player in terms of U.S. dollars. Likewise, while one player might refer to a region of a board using a term expressed in one language, another player might refer to the same region using a term from a different language. The translation services 854 may facilitate gameplay adaptations based on these differences.

Localization may also include, in some embodiments, localization of gameplay actions, such as bartering or trading, through visual interactions. For example, a player can initiate a barter or trade in the gameplay by creating a virtual list or manifest of goods or money to exchange, and both parties can then participate in the process by modifying the virtual list. The game engine can cause the edits to be restricted to what is possible within the constraints of the game. In embodiments, this aspect is enabled when the system determines that visual interaction may be useful due to differences in the language requirements of the players. Embodiments may also provide means of allowing players, despite language differences, to perform gameplay actions such as forming pacts, alliances, or agreements, based on exchanges of funds or promises to perform actions in the future. These may be made visually and/or textually as necessary. Moreover, the game engine may enforce the terms of the pact, alliance, or agreement within the gameplay. For example, a move that would be illegal in the terms of an agreement might be disallowed by the game engine.

Figure 9:
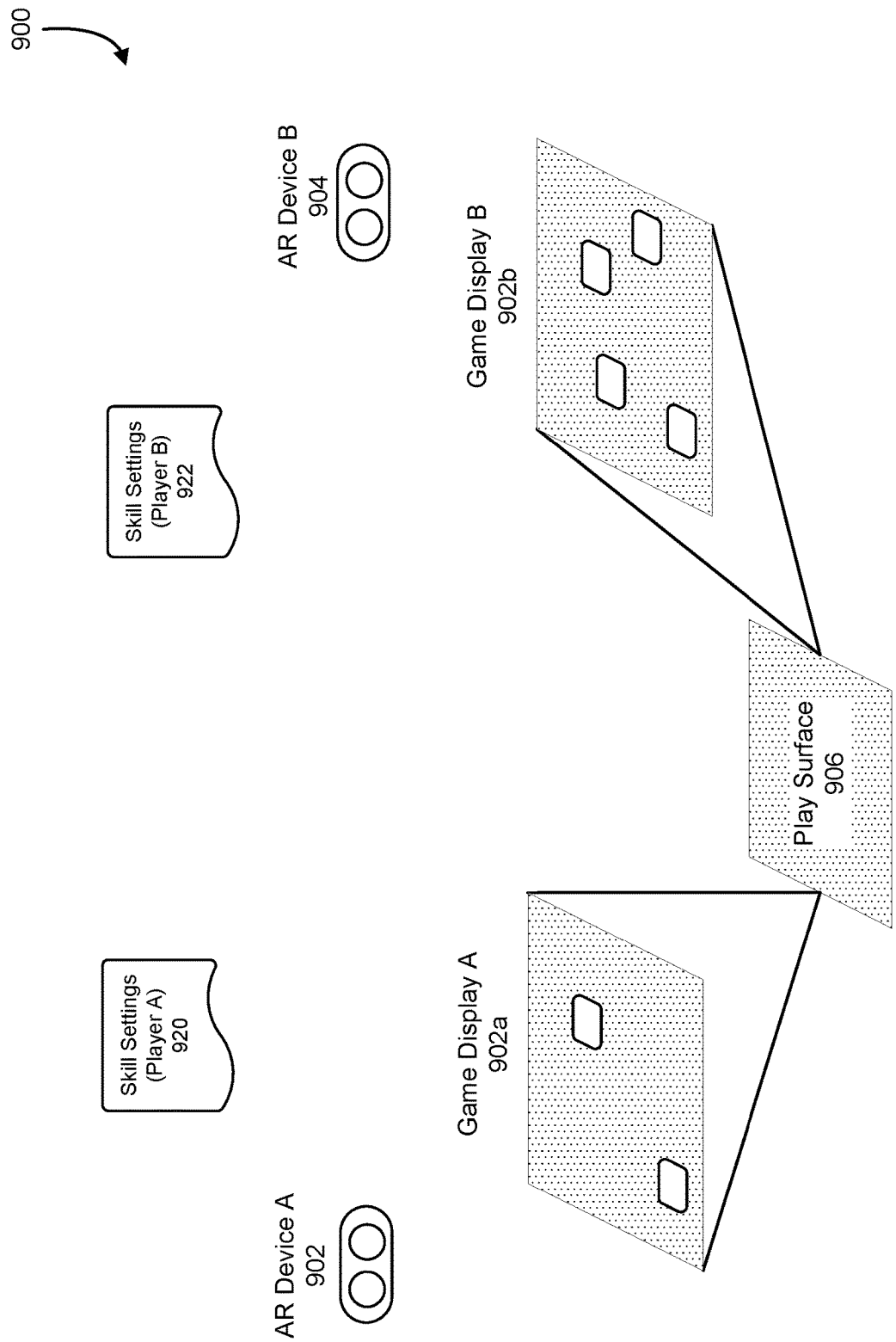
FIG. 9 illustrates an example of an embodiment of an augmented reality enhanced gameplay system incorporating player level customization, in accordance with an embodiment.

In addition to localization, another way in which gameplay may be adapted, for example by using the system depicted in FIG. 1, is by further personalizing the gameplay using player level customization. FIG. 9 illustrates an example of an embodiment of an augmented reality enhanced gameplay system incorporating player level customization, in accordance with an embodiment.

Here, player level customization refers to adaptations to the gameplay that are designed to adapt to differences in player's skill level. To illustrate, assume for the purposes of the example 900 that player "A" might be of relatively low skill in the game being played, or might simply prefer a more relaxed playing experience. Meanwhile, player "B" might be a more advanced player or might desire a more intense playing experience. Information about these preferences might be stored by the system, as depicted by the skill settings 920, 922 elements of FIG. 9.

The system may therefore, in accordance with the respective skill settings 920, 922, adjust the gameplay to adapt to these respective differences. For example, in an embodiment, the AR Device A 902 of player "A" renders a display of gameplay having a relatively low complexity compared to the display 902b rendered by the AR Device B 904 of player "B." This is the case even though the players are observing, through their respective AR devices, the same play surface 906.

With respect to FIG. 1, the adjustments to gameplay depicted by FIG. 9 may be implemented, at least in part, by the actions of the game engine service 122 and the personalization service 134. For example, the personalization service 134 may identify desired types and amounts of adaptations, and drive the game engine service 122 to apply those changes to the gameplay.

In an embodiment, the personalization service 134 instructs the game engine service 122 to incorporate additional gameplay elements that player "B" must contend with, compared to player "A." This has the effect of levelling the amount of skill required for player "B" to win the game, relative to player "A." The additional gameplay elements might, for example, include additional non-player characters opposing the actions of the more advanced player, additional terrain obstacles, additional game pieces attributed to player "A" but controlled by the system, and so forth.

Other adaptations may include additional rule complexity. For example, player "B" might have to contend with fog-of-war rules, advanced unit management rules, and so forth, which are not applied to player "A," or are automated on behalf of player "A."

Figure 10:
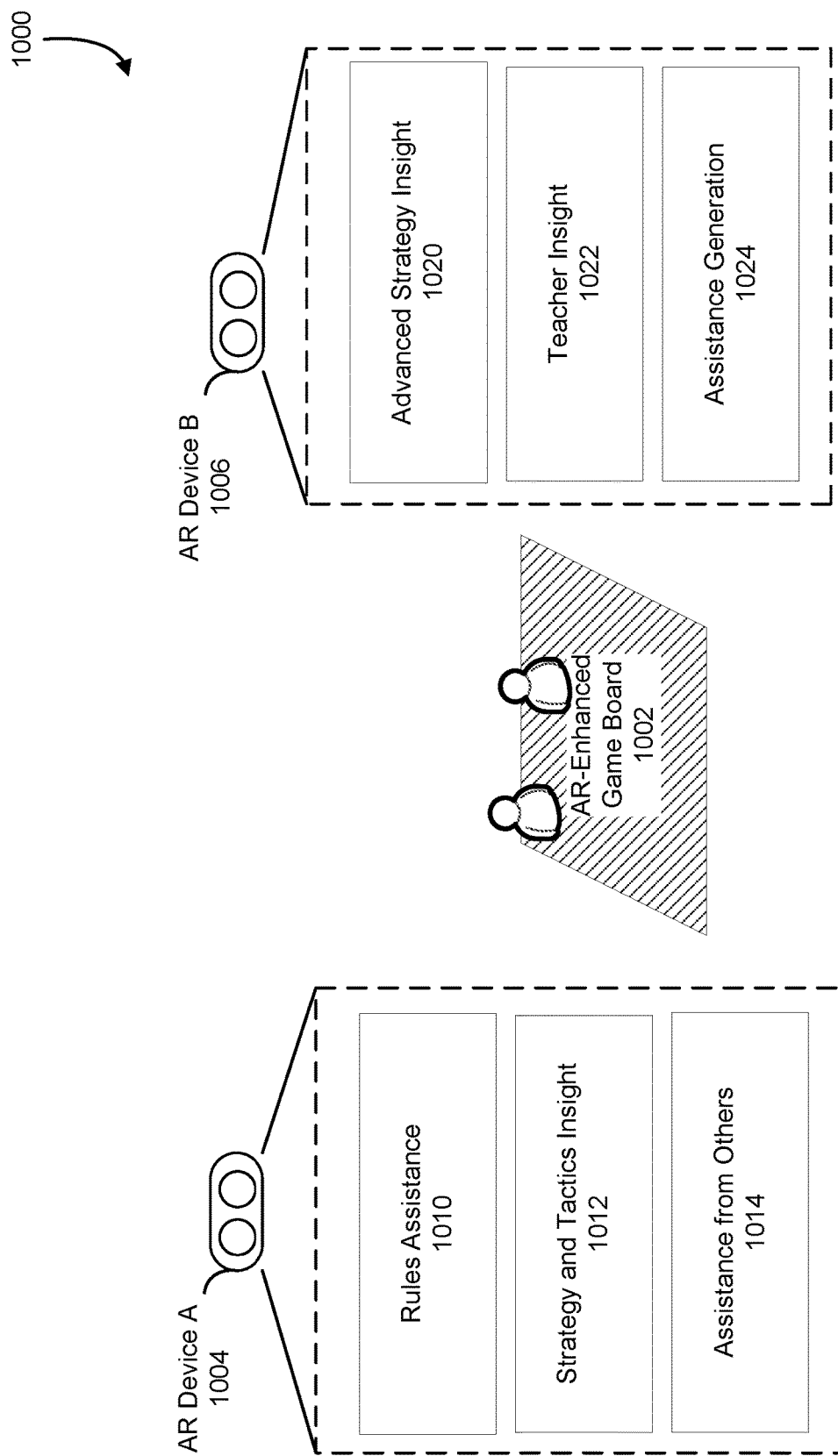
FIG. 10 illustrates further aspects of gameplay enhanced by player level customization, in accordance with an embodiment.

FIG. 10 illustrates further aspects of gameplay enhanced by player level customization, in accordance with an embodiment. In the example 1000 of FIG. 10, player "A" is assumed, for the purposes of the example, to be a novice student of the game, whereas player "B" is assumed to be an advanced player or teacher of the game. Each player views the AR-Enhanced game board 1002 from their own perspective, as generated by the respective AR Devices 1004, 1006.

The gameplay, as produced by the system 100 depicted in FIG. 1 and rendered by the AR Device A 1004 of player "A," is adjusted to facilitate the student's learning of the game.

In an embodiment, the gameplay for player "A" is adjusted, by the system 100 and AR Device A 1004, to include rules assistance 1010. For example, the AR Device A 1004 may render graphics showing allowable moves or hints about rules which might be applicable to the player's current situation. If the player attempts to make a move which is against the rules, the system might provide an explanation of why the rule is being disallowed. The AR Device A 1004 can render these aspects based on data and processing of the game engine service 122, rendering service 124, and personalization service 134.

In an embodiment, the gameplay for player "A" is adjusted, by the system 100 and AR Device A 1004, to include strategy and tactics insight 1012. This can include, for example, displaying suggested moves, highlight the effects of a move proposed by the player, and so forth. The AR Device A 1004 can render these suggestions based on data and processing of the game engine service 122, rendering service 124, and personalization service 134.

In an embodiment, the gameplay experience for player "A" is adjusted, by the system 100 and AR Device A 1004, to include assistance from others 1014. Here, assistance from others refers to hints or other communications that originates from other players, or other sources.

In an embodiment, assistance from others 1014 includes insight provided from player "B," delivered through the system 100 to the AR Device A 1004.

In an embodiment, assistance from others 1014 includes insight provided from a game streaming service. The assistance might, for example, include commentary from those observing the game in real time. In an embodiment, the system 100 applies machine learning algorithms to identify comments made by players in similar game situations, or in response to similar moves. The AR Device A 1004 can render these aspects based on data and processing of the game engine service 122, rendering service 124, and personalization service 134.

In various embodiments, the gameplay, as produced by the system 100 depicted in FIG. 1 and rendered by the AR Device B 1006 of player "B," is adjusted to facilitate player "B's" role as a teacher of the game.

In an embodiment, the gameplay experience of "player B" is adjusted by the system 100 and AR Device B 1006 by the inclusion of elements related to advanced strategy insight 1020. Whereas the more junior player might receive comparatively simply tips regarding strategy and tactics, the more advanced player B might receive more advanced tips. These may include insights which may facilitate the teacher role. For example, the AR Device B 1006 might render hints or suggestions which relate to the long term implications of a proposed move by player A or player B. In an embodiment, the system 100 (particularly the game engine) might identify moves which might be considered "instructive" because they would introduce situations in the game that the student would benefit from experiencing.

In an embodiment, the gameplay experience of "player B" is adjusted by the system 100 and AR Device B 1006 by the inclusion of elements related to providing teacher insight 1022. This might, for example, include information about moves the student considered but rejected, information about the skill level of the student, and so forth.

In an embodiment, the operations, choices, or decisions that are available to a player may depend on the player's absolute or relative skill level. This can comprise presenting fair substitutions of options, which may be put in play automatically by the game engine. For example, in an augmented game of chess, a novice player might be provided with an army of chess pieces in which the more complex pieces are omitted, or their behavior simplified. The substitutions may be made in a manner that are determined by the game engine to be fair. For example, the omitted pieces might be replaced with additional pieces, such as additional pawns or an additional queen. In another example, the complexity of cockpit in a flight simulator is reduced for novice players, and increased for advanced players.

In an embodiment, the gameplay experience of "player B" is adjusted by the system 100 and AR Device B 1006 by the inclusion of elements and features related to assistance generation 1024. This might include, for example, supporting gesture-based input to trigger the provision of a hint to the student, when it is apparent to the student or system that the student is struggling to make a suitable game decision. It might also include support for providing gameplay tips generated by the system, of which the teacher might approve or disapprove of sending to the student.

Figure 11:
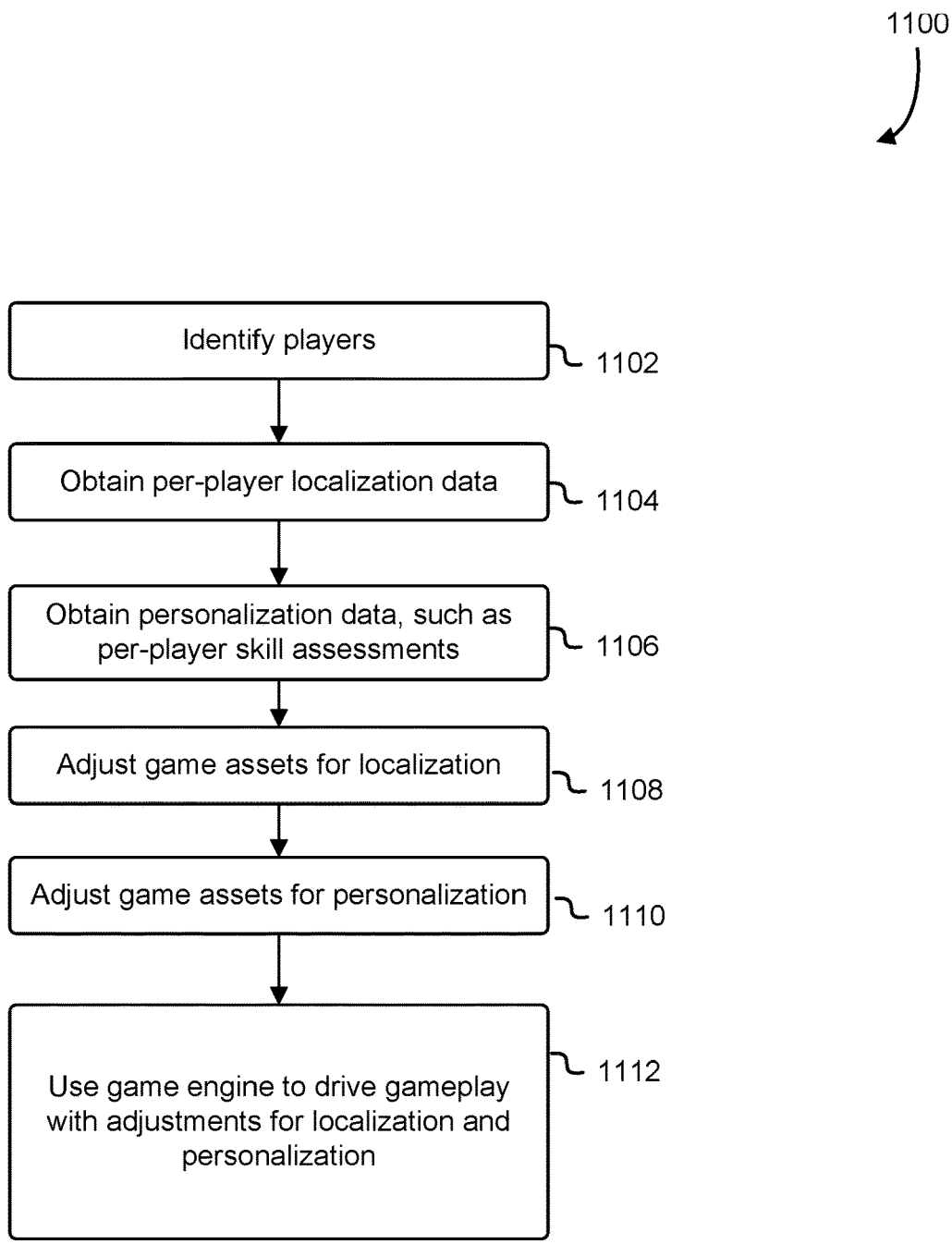
FIG. 11 illustrates an example process for enhancing physical gameplay by augmented reality localization and customization, in accordance with an embodiment.

FIG. 11 illustrates an example process for enhancing physical gameplay by augmented reality localization and customization, in accordance with an embodiment. Some or all of the process 1100, or any other processes described, or variations and/or combinations of those processes, may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1100 may be performed by any suitable system, including but not limited to augmented reality devices comprising a processor and a non-transitory memory on which instructions executable by the processor are stored. The augmented reality system may further comprise components such as those depicted in FIG. 1. The process 1100 includes a series of operations wherein an augmented reality device provides localized and personalized gameplay to each participant in an augmented reality enhanced game.

At 1102, the system 100 identifies the players. Player identification may be performed by the object player recognition service 120, based on one or more input factors such as identifying characteristics of the player's AR device, facial recognition of the player, voice identification, and so forth. The may be applied in combination.

At 1104, the system 100 obtains per-player localization data. This may be performed by retrieving information stored by the localization service 136 and/or personalization service 134, and index by the player's identity. In some embodiments, geographic information (such as the current location of the player, obtained via global-positioning features of an AR device) may also be used to retrieve an appropriate set of localization data.

At 1106, the system 100 obtains personalization data, such as per-player skill assessments, that can then be used by the system 100 to drive gameplay adjustments. These can be obtained by using the identity of a player, as obtained at 1102, to retrieve an appropriate information set via the personalization service 134.

At 1108, the system adjusts or loads various game assets to support localization in augmented reality. For example, the system might determine the locale(s) to which the system needs to adjust, and load game assets (such as maps, textures, fonts, textual resources, translation services, and so forth) that might be needed. Note that in some cases, multiple sets of such assets may be needed, in order to provide individualized localization. This operation may involve the rendering service 124, as it relies on assets to perform graphical rendering, and the game engine service 122, as it relies on rule sets and other assets to drive gameplay.

At 1110, the system adjusts or loads various game assets to support game personalization in augmented reality. For example, additional rulesets might be loaded, graphical elements corresponding to additional non-player characters or obstacles might be loaded, and so on. This operation may involve the rendering service 124, as it relies on assets to perform graphical rendering, and the game engine service 122, as it relies on rule sets and other assets to drive gameplay.

At 1112, the system uses the game engine to drive gameplay that incorporates adjustments for localization and personalization.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1200 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 12. Thus, the depiction in FIG. 12 should be taken as being illustrative in nature and not limiting to the scope of the disclosure.

The network 1204 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1204 are well known and will not be discussed in detail. Communication over the network 1204 can be enabled by wired or wireless connections and combinations thereof. In an embodiment, the network 1204 includes the Internet and/or other publicly-addressable communications network, as the environment 1200 includes one or more web servers 1206 for receiving requests and serving content in response thereto, although for other networks an alternative device serving a similar purpose could be used as would be apparent to one of ordinary skill in the art.

The illustrative environment 1200 includes one or more application servers 1208 and data storage 1210. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1208 can include any appropriate hardware, software and firmware for integrating with the data storage 1210 as needed to execute aspects of one or more applications for the electronic client device 1202, handling some or all of the data access and business logic for an application. The one or more application servers 1208 may provide access control services in cooperation with the data storage 1210 and is able to generate content including, text, graphics, audio, video, and/or other content usable to be provided to the user, which may be served to the user by the one or more web servers 1206 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1202 may be processed by the electronic client device 1202 to provide the content in one or more forms including forms that are perceptible to the user audibly, visually, and/or through other senses. The handling of all requests and responses, as well as the delivery of content between the electronic client device 1202 and the one or more application servers 1208, can be handled by the one or more web servers 1206 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1210 can include several separate data tables, databases, data documents, dynamic data storage schemes, and/or other data storage mechanisms and media for storing data relating to a particular aspect of the present disclosure. For example, the data storage 1210 may include mechanisms for storing various types of data and user information, which can be used to serve content to the electronic client device 1202. The data storage 1210 also is shown to include a mechanism for storing log data, such as application logs, system logs, access logs, and/or various other event logs, which can be used for reporting, analysis, or other purposes. It should be understood that there can be many other aspects that may need to be stored in the data storage 1210, such as page image information and access rights information, which can be stored in any of the above listed mechanisms as appropriate or in additional mechanisms in the data storage 1210. The data storage 1210 is operable, through logic associated therewith, to receive instructions from the one or more application servers 1208 and obtain, update, or otherwise process data in response thereto. The one or more application servers 1208 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1208.

In one embodiment, a user, through a device operated by the user, can submit a search request for a match to a particular search term. In this embodiment, the data storage 1210 might access the user information to verify the identity of the user and obtain information about items of that type. The information then can be returned to the user, such as in a results listing on a web page that the user is able to view via a browser on the electronic client device 1202. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1204. These devices also can include virtual devices such as virtual machines, hypervisors, and other virtual devices capable of communicating via the network 1204.

Various embodiments of the present disclosure utilize the network 1204 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1204 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1206, the one or more web servers 1206 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1200 can include a variety of data stores and other memory and storage media as discussed above. These can reside in a variety of locations, such as on a storage medium local to (and/or resident in) one or more of the computers or remote from any or all of the computers across the network 1204. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
   at least one processor; and
   a memory comprising executable instructions that, in response to execution by the at least one processor, cause the system to at least:
      identify a characteristic of a physical object placed on a physical surface;
      obtain a rule set and game state, the rule set obtained based at least in part on an association between the characteristic and the rule set;
      initialize a game engine, based at least in part on the rule set and the game state; and
      render augmented reality gameplay incorporating the physical surface, based at least in part on output of the game engine and providing a first augmented view of the physical surface and the physical object, wherein the augmented reality gameplay is adapted by the game engine to adjust at least one of game complexity or game rules based, at least in part, on a gameplay adaptation associated with a first player, wherein a second player is provided a second augmented view of the physical surface and the physical object, the first and second augmented views of the physical surface and the physical object being different based at least in part on the gameplay adaptation.

2. The system of claim 1, the memory comprising further executable instructions that, in response to execution by the at least one processor, cause the system to at least:
   identify a prospective change to the game state based at least in part on an observation of the physical object on the physical surface;
   validate the prospective change to the game state based at least in part on the rule set;
   update the game state based at least in part on the prospective change; and render the augmented reality gameplay in accordance with the updated game state.

3. The system of claim 1, the memory comprising further executable instructions that, in response to execution by the at least one processor, cause the system to at least:
   render the physical object, in the augmented reality gameplay, as a game element.

4. The system of claim 1, the memory comprising further executable instructions that, in response to execution by the at least one processor, cause the system to at least:
   determine, based at least in part on the rule set, to localize a game element; and
   render the augmented reality gameplay to incorporate the localized game element, in accordance with a localization preference of a first user.

5. The system of claim 1, the memory comprising further executable instructions that, in response to execution by the at least one processor, cause the system to at least:
   generate a replay of physical gameplay based at least in part on a history of changes to the game state.

6. The system of claim 1, the memory comprising further executable instructions that, in response to execution by the at least one processor, cause the system to at least:
   obtain information indicative of at least one of a skill level, preference, viewpoint, or game position associated with the first player; and
   render the augmented reality gameplay to provide, to the first player, at least one of game elements, information, or hints not provided to the second player.

7. A computer-implemented method, comprising:
   identifying a characteristic of a physical object located on top of a physical surface;
   determining a rule set and a first game state based at least in part on associating the characteristic with the rule set;
   initializing a game engine, based at least in part on the rule set and game state; and
   rendering an augmented reality display providing an augmented view of the physical surface and the physical object to at least one player and incorporating the physical object and the physical surface, based at least in part on a second game state generated by the game engine, wherein the augmented reality display is based, at least in part, on adaptations of at least one of game complexity or game rules, wherein the adaptations are based, at least in part, on a gameplay adaptation associated with the at least one player, wherein the augmented view is not provided to at least another player, the at least another player being provided another augmented view of the physical surface and the physical object, the augmented view and the another augmented view being different based at least in part on the gameplay adaptation.

8. The computer-implemented method of claim 7, wherein the characteristic of the physical object is usable to obtain an identifier of the rule set.

9. The computer-implemented method of claim 7, wherein the characteristic of the physical object is usable to obtain information indicative of the first game state.

10. The computer-implemented method of claim 7, further comprising:
    identifying a prospective change to the game state based at least in part on an observation of the physical object on the physical surface;
    validating the prospective change to the game state based at least in part on the rule set; and
    updating the game state based at least in part on the prospective change.

11. The computer-implemented method of claim 7, wherein the game state comprises at least one of player identity, player skill level, localization preferences, or game customization preferences.

12. The computer-implemented method of claim 7, further comprising:
    rendering a game piece in the augmented reality display by overlaying the game piece on the physical object.

13. The computer-implemented method of claim 7, further comprising:
    rendering the augmented reality display to include, for a first player, at least one of a game element, game information, or game hint not provided to a second player.

14. The computer-implemented method of claim 7, wherein the physical object, in the augmented reality display, is rendered in accordance with a localization preference of a first player and based at least in part on the rule set.

15. A non-transitory computer-readable storage medium having stored thereon executable instructions that, in response to being executed by one or more processors of a computing device, cause the computing device to at least:

determine a characteristic of a physical object located on a physical surface;

obtain information indicative of a rule set and a first game state based at least in part on the characteristic, the rule set determined based, at least in part, on an association between the characteristic and the rule set;

initialize a game engine, based at least in part on the rule set and game state; and render augmented reality gameplay providing to a first player a first augmented view of the physical surface and the physical object and incorporating the physical surface and the physical object, based at least in part on a second game state generated by the game engine, wherein the augmented reality gameplay is adapted by the game engine based, at least in part, on a gameplay adaptation associated with at least one player, wherein the adaptations modify at least one of game complexity or game rules, wherein the first augmented view is not provided to a second player, the second player being provided a second augmented view, the first and second augmented view being different based at least in part on the gameplay adaptation.

16. The non-transitory computer-readable storage medium of claim 15, having stored thereon further executable instructions that, in response to being executed by one or more processors, cause the computing device to at least:
identify a prospective change to the game state based at least in part on an observation of the physical surface;
validate the prospective change to the game state based at least in part on the rule set; and
update the game state based at least in part on the prospective change.

17. The non-transitory computer-readable storage medium of claim 15, having stored thereon further executable instructions that, in response to being executed by one or more processors, cause the computing device to at least:
render, in augmented reality, a graphical element indicative of repositioning the physical object on the physical surface.

18. The non-transitory computer-readable storage medium of claim 15, wherein the physical object is rendered, in augmented reality, as a game piece.

19. The non-transitory computer-readable storage medium of claim 15, having stored thereon further executable instructions that, in response to being executed by one or more processors, cause the computing device to at least:
generate a first augmented reality display associated with the first player; and
generate a second augmented reality display associated with the second player, wherein elements are included in the second augmented reality display but not the first augmented reality display, based at least in part on information indicative of at least one of a skill level, viewpoint, or preference of at least one of the first and second players.

20. The non-transitory computer-readable storage medium of claim 15, wherein elements of the augmented reality gameplay are localized based at least in part on a preference of a player.

* * * * *